United States Patent [19]
Reh et al.

[11] Patent Number: 5,538,162
[45] Date of Patent: Jul. 23, 1996

[54] APPARATUS AND METHOD FOR DOSING

[75] Inventors: Lothar Reh, Zumikon; Marc Tesch, Forch; Beat Häni, Zuzwil; Arthur Ruf, Schwerzenbach; Thomas Meili, Zürich; Frank Goedicke, Niederhelfenschwil, all of Switzerland

[73] Assignee: Bühler AG, Uzwil, Switzerland

[21] Appl. No.: 249,124

[22] Filed: May 25, 1994

Related U.S. Application Data

[63] Continuation-in-part of Ser. No. 942,673, Sep. 9, 1992, Pat. No. 5,469,994.

[30] Foreign Application Priority Data

Sep. 9, 1991 [CH] Switzerland ............................ 2641/91
May 25, 1993 [CH] Switzerland ............................ 1565/93
Jul. 29, 1993 [CH] Switzerland ............................ 2285/93

[51] Int. Cl.$^6$ ................................................. B67D 5/08
[52] U.S. Cl. ........................... 222/63; 222/195; 406/30; 366/101; 366/107
[58] Field of Search ............................ 222/52, 63, 64, 222/195, 196, 630, 55; 406/14, 30, 137, 138; 366/101, 107

[56] References Cited

U.S. PATENT DOCUMENTS 4,532,108  7/1985  Becht, IV ............................ 422/143
4,784,533  11/1988  Teigen ................................. 406/14

FOREIGN PATENT DOCUMENTS 0308026  3/1989  European Pat. Off. .
0707690  4/1954  United Kingdom .................. 406/138

OTHER PUBLICATIONS

Patent Abstracts of Japan Jun. 10, 1980 vol. 4, No. 80 (M-15).
Patent Abstracts of Japan Aug. 10, 1988 vol. 12, No. 292 (M-729).
"Fluidization" Cambridge University Press Coexistence of Fluidized Flow in Picked Bed Flow . . . L. S. Leung, Jones 1978 pp. 116–131.
P. J. Jones et al "Fluidization", Academic Press London Chap. 8 Downflow–of Solids Through Pipes & Valves 1985 pp. 293–330.
D. P. O'Dea et al Powder Technology 62 pp. 241–247 "Gas–Solids Flow Through the Bottom Restrictive of . . . "1940.
M. Robin–Judd et al The American Inst. of Chemical Engineers "The Flow of Fine, Dense Solids Down . . . "1978.
R. J. Burkett et al Chemical Eng. Science, vol. 26 pp. 405–417 Pergamon Press /"On the Flow of Fluidized . . . " 1971.
L. Massimilla "Fluidization" Academic Press NY Chap 15 Flow–Properties of the Fluidized Devise . . . 1971.
W. Barth et al, Chemie–Eng.–Techn. 29 pp. 597–602 "Neves Verfahren Zur Bestimming . . . " 1957.
Tesch (thesis) "Zeitkonstantes Dosiereu Feiner Feiner Feststoffe" Zurich Diss. Etll Nr 9583 1991.
*Foreign Patent Document* European Patent Application 0084887 Applicant: Stone & Webster Engineering Aug. 3, 1983.

*Primary Examiner*—Andres Kashnikow
*Assistant Examiner*—Lisa Douglas
*Attorney, Agent, or Firm*—Martin A. Farber

[57] ABSTRACT

A dosing apparatus provides for dosing a particulate phase within a free flowing two phase flow of a gas phase and the particulate phase, wherein the two phase flow leaves a fluidized bed. The apparatus includes, at its bottom, a gas inlet mechanism to supply the gas via an orifice, and an outlet orifice with a discharge pipe. Control of the gas flow to maintain a predetermined level of the bed is attained by weighing the contents of the bed or by use of sensors within a treatment space of the apparatus. Widening mechanism may be located subsequent to the outlet orifice for widening the stream of particulate phase for exposing an enlarged surface area of particles for treatment.

22 Claims, 15 Drawing Sheets

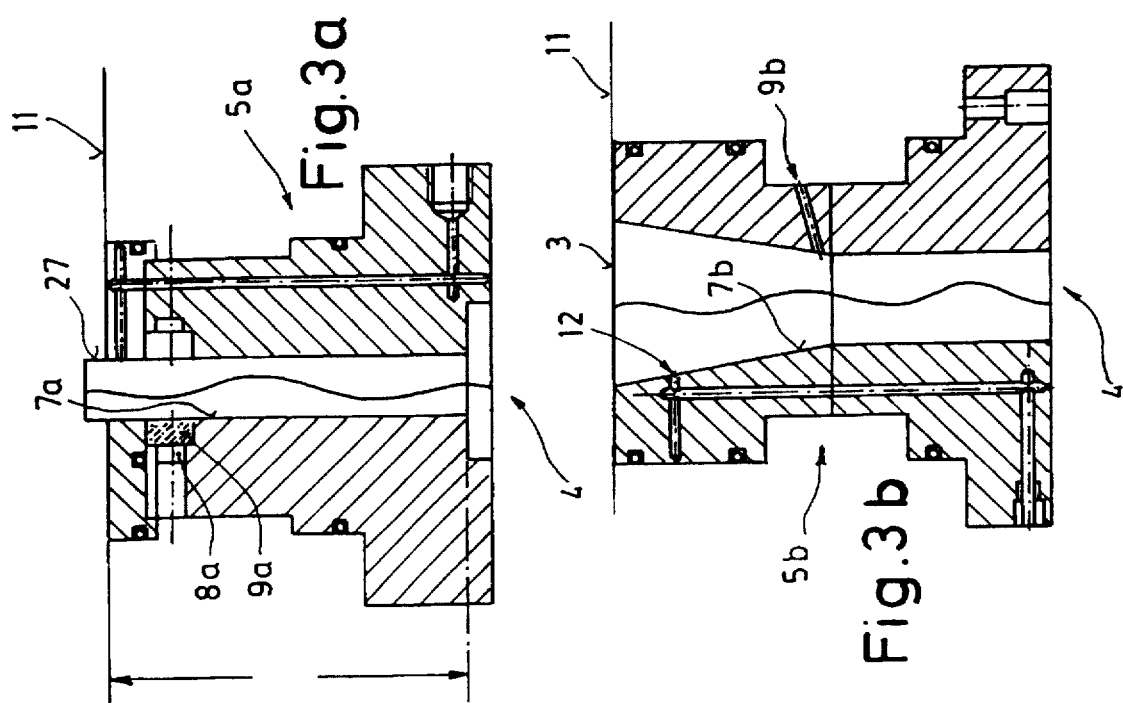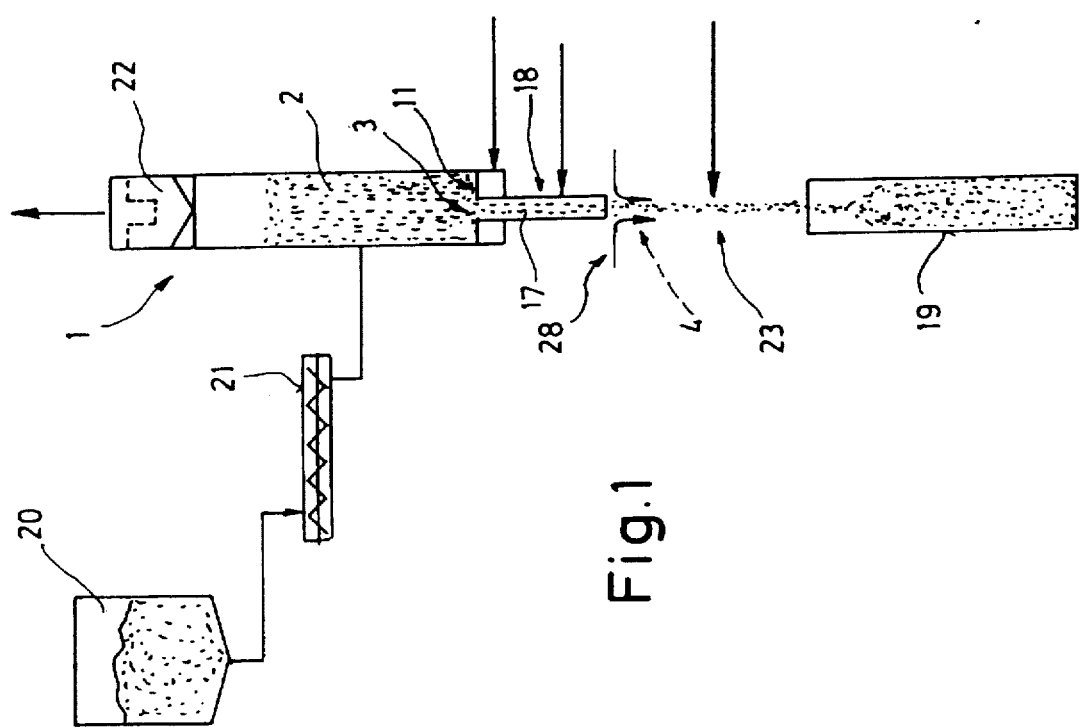

APPARATUS AND METHOD FOR DOSING

RELATED APPLICATIONS

This application is a continuation-in-part of the commonly assigned patent application Ser. No. 07/942,673, filed Sep. 9, 1992, now U.S. Pat. No. 5,469,994.

FIELD OF THE INVENTION

The invention relates to an apparatus for dosing a particulate phase present in a gas/particle flow, and to a dosing method.

BACKGROUND OF THE INVENTION

The accuracy with which a predetermined flow of particles is adjusted in terms of mass or volume is of considerable importance in various fields of process engineering, and the levels of requirements differ. When conveying solid particles through pipelines, for example, metering screws, rotary vane feeders or metering valves are used wherein, however, periodic fluctuations superposed on the outflowing flow of solid mass may occur and may prove disadvantageous. Also in other processes, such as in feeding fluidized, and optionally heated, solid particles into a reaction space, a controlled mass flow is essential. Another application is mixing where different components in different and precise amounts have to be added.

If fluid flows from bottom to top through a bed of solid particles, the particles will be entrained when its velocity reaches a certain level which is called the incipient fluidization velocity: the bed of particles is loosened and will be fluidized. From the fluidization point, the pressure drop above the fluidized-bed thus formed remains essentially constant and is dependent on the volume flow of the fluid.

The behavior of a gas/solid stream flowing out of a fluidized-bed as well as the type of possible flow states, their tendency to destabilization and measures for counteracting this phenomenon have been investigated both theoretically and empirically in various publications. In particular, standpipes which permit feeding of a solid stream via outflow orifices at their lower end—in particular with a variable cross-section—and which act as a pressure barrier against the reaction vessel, are used for passing fluidized solids from fluidized beds into reaction or treatment spaces which, in general, are under a certain positive pressure. Extensive investigations [see P. J. Jones, L. S. Leung "Fluidization", Cambridge University Press, 1978; "Fluidization", Academic Press, London, 1985; D. P. O'Dea, V. Rudolph, Y. O. Chong, "Powder Technology", 62, (1989) 291] have been made on the conditions under which the various flow states will occur within such standpipes. The coexistence of different forms of flow in a standpipe was detectable on the basis of X-ray photographs (M. R. Judd, P. D. Dixon, The American Inst. of Chem. Eng., 1978), that is, a loosely packed bed just above the constricted outflow orifice coexisting with a flow state in which solid particle strands flow downward at a high rate. The flow field, as such, is therefore by no means homogeneous, and the properties of the solid particle flow through the standpipe are no longer comparable with those of the fluidized particles in the fluidized-bed.

Other investigations have been concerned with the question of the effect of outflow orifices or nozzles out of a fluidized-bed on the flow state of the gas/solid stream. Thus, when such an orifice is approached by the mass flow within the fluidized-bed, the porosity is supposed to decrease so that the flow state of the gas/solid stream before and after the orifice will differ. Furthermore, a certain proportion of gas will be found in the outflowing gas/solid stream (see R. J. Burkett, P. Chalmers-Dixon, P. J. Morris, D. L. Pyle, *Chem. Eng. Sc.*, 1971, Vol. 26, 405). The mass flow of solid particles flowing through an orifice of a fluidized-bed apparatus will depend not only on the particle properties but also essentially on the height of the fluidized-bed above such orifice and its diameter, but is, up to a certain orifice's diameter, independent of the velocity of fluidizing gas. If a gas/solid stream does not flow through simple orifices of a fluidized-bed apparatus but thorugh nozzles, the proportion of gas in the gas/solid stream will depend on the ratio of the diameter of the nozzle to its length (see L. Massimilla, "Fluidization", *Acad. Press*, N.Y., 1971).

EP-A-0 084 887 describes a flow controller for solids which flow out of a fluidized-bed apparatus and through a standpipe into a solids consumer. Here a pressure medium is passed into a control hopper associated with a standpipe and having a plenum chamber; the resulting pressure difference between the control hopper and the solids consumer determines the through-put of solids. At the lower end of the standpipe or of the control hopper, a bed of solids is formed which cannot be compared with a homogeneous gas/solid stream out of a fluidized-bed.

Fluidized beds have been widely used in combustion, gasification and chemical gas/solid reaction applications of finely divided solids due to the optimally adjustable conditions and temperature stability. To be able to ensure controlled feeding of solid particles into treatment and reaction spaces, steady-state and homogeneous mixing are preconditions and, therefore, of decisive importance.

One field where exact metering is of importance is mixing of different materials where a precise proportion of the individual materials to be combined shall be maintained. This problem can be solved, in many instances, by means of volumetric dosage where units of volume of a predetermined size are fed into a mixing apparatus. However, volumetric dosage suffers under an inherent unprecision if the bulk densities of solids to be combined are rather different. To solve this problem, it would be conceivable to meter according to weight. This, however, has as a precondition that the material is present as a mass or bulk which in turn may render mixing more difficult, particularly of materials which tend to cluster or to adhere so as to form lumps when mixed with a liquid. This is, for example, the case with fly ashes. Certainly, the use of continuous operating balances would be conceivable, but it is known that precision of such type of balances is very limited.

SUMMARY OF THE INVENTION

It is an object of the present invention to provide an apparatus and a process which ensure high accuracy of dosing, even in the case of large solid mass flows, in conjunction with small metering fluctuations over both long and very short periods.

It is a further object of the invention to use a fluidized-bed as a dosing vessel.

Another object of the present invention is to enhance control over the mass flow out of a fluidized-bed, particurlarly in such a way that the process parameters remain independent of type and quantity of solids.

More particularly, it is an object of the invention to provide such a control which can operate without the need of calibrating curves as a base of adjustment of operating parameters.

A further object of the invention is to provide a mixing system enabling an exact dosage of the components, particularly if at least one component is a liquid.

Another object of the present invention is to optimize the spacial distribution of solids to be treated or mixed so as to improve access either of a treating medium and/or of a substance to be combined to such solids.

BRIEF DESCRIPTION OF THE DRAWINGS

Further objects, characteristics and advantages will become apparant from the following description of embodiments with reference to the accompanying drawings, in which:

FIG. 1 shows a basic diagram of an arrangement comprising a fluidized-bed apparatus and a metering device according to the invention;

FIGS. 3a and 3b show different embodiments of hollow bodies according to the invention, in two part sections in each case;

FIG. 8 is a cross-section through an alternative embodiment of a fluidized-bed apparatus according to the invention, while FIG. 8a is a graph showing the dependency of pressure existing in a fluidized-bed of FIG. 8 upon its height;

FIG. 11 and 11a show each a practical application of the invention in the field of mixing and treating wherein FIG. 11a illustrates a particularly preferred embodiment comprising means for controlling spacial distribution of solids for better acces of a treating medium;

DETAILED DESCRIPTION OF THE DRAWINGS

Figure 2:
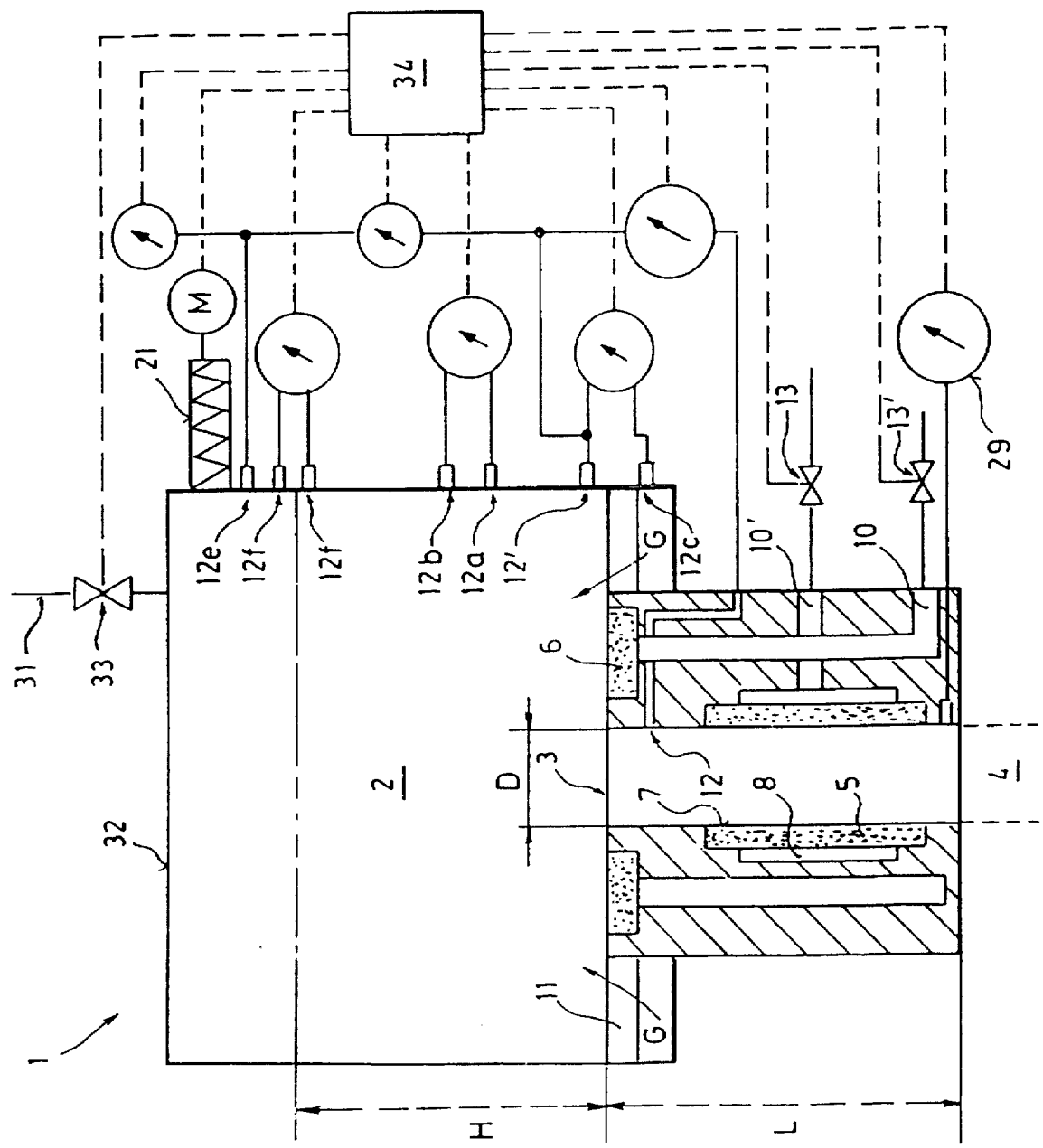
FIG. 2 shows a section through a fluidized-bed apparatus having an outlet orifice.

FIG. 1 shows, in schematic form, the principle in accordance with the invention according to which a gas/solid stream 17 flowing out of a fluidized-bed apparatus 1 is introduced into a reaction space 19 via a metering arrangement 18. The solid (in the form of particles whose diameter is generally chosen to be smaller than 100 μm in view of the reactions and, in particular, reaction times desired which take place in the reaction space 19) is fed from a storage container 20 via a metering screw 21 into the fluidized-bed apparatus 1. A loosening means (not shown) known per se and being provided in the outflow region of the storage container 20 ensures substantially uniform outflow of the solid particles even with different heights of the contents in the storage container 20.

The metering screw 21 may be formed as a hollow helix in order to ensure that the particles are conveyed as gently as possible. The speed of the metering screw 21 and the position of introduction of the solid particles fed by the metering screw 21 into the fluidized bed 2 may be neglected, although speed might be one of the parameters forming part of the control as will be described later with reference to FIG. 11.

Fluidizing gas G flows from bottom to top of the apparatus 1, i.e. through a bottom plate 11 of the fluidized-bed apparatus 1, thus fluidizing the solid particles fed in to form a fluidized bed 2. As the inflow velocity of gas increases, the bed is increasingly loosened so that the solid particles in the two-phase system, thus created, can flow over smaller or greater distances. Above a certain inflow velocity, at which a initially fixed bed becomes a fluidized bed (the so-called "incipient fluidization point"), the pressure drop in the bed is virtually constant. As will be seen later, this is another important parameter for the control of the apparatus according to the invention.

In theory, the region of flow rates for a fluidized bed extends from the above discussed lower limiting velocity (from the incipient fluidization point upwards) to an upper limiting velocity which may be characterized by the fact that the bed has been loosened to such extent that each individual particle is suspended in the fluid stream without being influenced by an adjacent particle. This region of flow rates can be divided into two parts, i.e. a homogeneous part and an inhomogeneous part. Low inflow velocities of the fluidizing gas are associated with a homogeneous fluidized bed, and, accordingly, high inflow velocities with an inhomogeneous fluidized bed. The void content of a homogeneous fluidized bed is constant as a function of time and space, in contrast to an inhomogeneous fluidized bed wherein this content is subject to pronounced fluctuations as a function of space and time, and bubbles or even channels will form between agglomerations of particles. Broadly, homogeneous fluidized beds will form only on fluidization by a liquid, while fluidization by a gas will always result in the formation of bubbles which will become even larger towards the upper limnit of the region of flow rates.

However, it has been found that in contrast to the upper region of a fluidized bed where relatively great inhomogeneities may occur, it is within the bottom area where the arrangement of the respective outlet orifice (3 in the present example according to the invention) is especially useful, because there sufficient homogeneity can be expected, particularly owing to the measures according to the invention which will be described below.

If the fluidized solid is to be metered constantly as a function of time from such a fluidized bed 2, this can usefully be effected only from an area where a homogeneous fluidized bed exists. This is because only then, the solid particles are uniformly distributed within the fluidized bed volume to be removed; in an ideal case, there are no binding forces between the particles. A spherical shape of the particles, on the one hand, and uniform size of them, on the other hand, are advantageous. In the case of very different particle sizes, separation may occur so that the smallest particles collect close to the free or upper surface of the fluidized bed 2 being discharged at inflow velocities which exceed the fluidizing velocity. In practice, there will always be a certain amount of fine liberation particles which can be separated off by means of a dust filter arrangement 22 (or other separator) and, if necessary, can immediately be recycled. Thus, a substantially constant particle distribution will be achieved in the fluidized bed 2 over long periods.

The gas/solid mixture of the fluidized bed 2 behaves substantially like a liquid; the gas/solid stream 17, which is present in essentially homogeneous form in the fluidized bed 2 can "flow out" via the outlet orifice 3 in the bottom 11 of the fluidized-bed apparatus 1, and into an outflow pipe 4. For example, after introduction of a gas in a mixing section 23, the gas/solid stream 17 can be introduced into the reaction space 19.

As stated above, the advantageous properties of the fluidized bed 2, in particular with respect to mass transfer and heat transfer as well as optimal mass ratios of the reactants (in a broader sense), can be used to simplify and to accelerate many processes. This is, of course, possible only when structural properties are maintained in the outflowing gas/solid stream. Thus, as discussed above, the object is not only quantitatively to meter the solids present in the outflowing gas/solid stream, but also to maintain, and even increase, the homogeneity of this stream, i.e. to fulfil a qualitative condition.

According to the invention, this is effected by a metering means 18 shown only diagrammatically in FIG. 1. A nozzle 28, which in particular is annular and feeds gas in coaxial relationship with the outflowing gas/solid stream, is provided at or adjacent to said metering means 18. The stability of the gas/solid stream achieved by the metering means 18 is, thus, maintained. To avoid any perturbation of the gas/solid stream as far as possible, this gas feed should take place parallel to the direction of flow, in particular in an annular form although individual nozzles arranged symmetrically with respect to the outflow will also be possible—and the velocity of the surrounding gas fed in should be essentially identical to the velocity of the gas/solid stream.

The function of the metering means 18 is illustrated by a first embodiment shown in FIG. 2. The outlet orifice 3, preferably arranged in the center of the bottom 11 of the fluidized bed apparatus 1 and having a diameter D, is aligned with the outflow pipe 4. The gas/solid stream 17 (see FIG. 1) flows through this pipe 4 out of the fluidized bed 2. A fluidizing nozzle 6 is arranged symmetrically to the outlet orifice 3, through which fluidizing nozzle 6 fluidizing gas is introduced into the fluidized bed 2 via a pneumatic pipe 10, in addition to the gas (arrow G) which flows through the bottom 11 of the fluidized-bed apparatus 1. Here, the fluidizing nozzle 6 is in the form of an annular channel having a porous insert with the result that fluidization can additionally be effected concentrically in the outlet orifice 3. As a result, it is possible to counteract (to a certain extent, even not completely) the formation of instabilities which are characteristic of the entry zone. It has also been found that drawing of bubbles into the outflow pipe 4 can be inhibited in this way. (The velocity of gas fed in addition via the fluidizing nozzle 6 should, therefore, be smaller than the velocity of the gas which flows through the bottom 11 of the fluidized-bed apparatus 1). Solid bridges which preferentially form precisely in the region of the outlet orifice 3 can, thus, be broken up. Essentially, however, only a contribution to homogenization of the gas/solid stream flowing out through outflow pipe 4 can be made by means of such fluidizing nozzles 6; hence, the solid mass flow can be influenced only to a very small extent, since bubbles would then be likely to be drawn in.

If, however, a hollow body 5, in the embodiment shown, for example, in FIG. 2, is provided as far as possible directly adjacent to the outlet orifice 3, time-constant, bubble-free metering of this solid mass throughput can be achieved. This cylindrical hollow body 5 has a porous wall 7, e.g. of ceramic material, which in turn is surrounded by an annular gas introduction channel 8. This is likewise fed with fluidizing gas via a pneumatic pipe 10', which may be connected by the pneumatic pipe 10 to the fluidizing nozzles 6, and valves 13, 13'. If necessary also directional valves and/or pressure relief valves may be provided. Thus, it is evident that the hollow body fulfills the function of the nozzle 28 discussed above, although it would also be possible to have a series arrangement of the body 5 and the nozzle 28.

A pressure measuring point 12 may be arranged as close as possible to the outlet orifice 3 in the wall 7 of the hollow body 5, by means of which pressure measuring point 12 the pressure difference between the fluidized bed 2 in the region of the bottom and the outlet pipe 4 close to the outlet orifice 3 is determined in conjunction with another pressure measuring point 12' arranged close to the bottom 11 of the fluidized-bed apparatus 1. For this purpose, a piezoresistive differential pressure sensor or two individual piezoresistive pressure sensors can be provided, if necessary. By positioning the pressure measuring points 12, 12' in this way, the dead time between the entry of the solid into the outlet orifice 3, the measurement of the solid mass flow at the pressure measuring points 12, 12' and the effect on the solid mass flow with regard to throughput and homogeneity is minimized.

Moreover, by comparing pressure at the sensors 12' and 12c which are just above and below the bottom plate 11, a pressure drop will indicate that the porous bottom 11 is clogging, thus either relasing an alarm or stopping further operation or trying to loosen the solids which cause that clogging by an intensified stream of fluidizing gas by adjusting valve 13 correspondingly. Which one of these methods is selected will depend from some operational parameters, particularly on the nature of the particulate solids in the fluidized bed, but in some cases also on the nature (or humidity) of the fluidizing gas.

The measured data available from this pressure difference measurement are fed, for example, via a programmable logic controller 34 having an integral software regulator, which in turn controls the fluidization of the outflowing gas/solid stream and/or gas introduction into the outflowing gas/solid stream via the gas introduction channel 8 and/or the fluidizing nozzel(s) 6.

Control of the outflowing solid mass flow can be effected via a measuring device 29 for determining the solid mass flow in the region of the outflow pipe 4 which is directly adjacent to the hollow body 5. These measured data are likewise fed via the programmable logic controller 34 which in turn controls the fluidization of the outflowing gas/solid flow and/or gas introduction into the outflowing gas/solid flow via the gas introduction channel 8 and/or the fluidizing nozzle(s) 6. The solid mass flow call be determined over a delay zone by two pressure difference measurements or another contactless measuring means.

The amount of additional fluidizing gas which has to be added to influence the solid mass throughput is less than 0.19% of the solid mass throughput, with the result that extremely short regulation and control times of less than 100 milliseconds are possible.

Since, as described above, the quality of metering of the outflowing solids is determined to a very substantial extent also by the homogeneity of the outflowing gas/solid stream, any possible instability sources must be eliminated by appropriate measures in the fluidized bed 2 itself. Thus, instability limits can be increased, for example, by an advantageous embodiment of the bottom 11 of the fluidized bed. If, for example, highly porous sintered bottoms having an average pore diameter of 25 µm and a thickness of the bottom plate 11 of about 20 mm are chosen, fluid flows in a finely divided form into the fluidized bed 2. Fluidized bed bottoms 11 which are capable of vibration and which may be caused to vibrate by a pulse generator will support this process. The use of stirrers is also possible. Fluidizing gas which pulsates by flowing in through the bottom 11 of the fluidized-bed apparatus 1 likewise improves the homogenization of the fluidized bed 2, possibly in addition to the measures described above.

The region of the entry zone, which is not unproblematic, is governed by the ratio of the diameter D of the outlet orifice 3 to the height H and/or the bottom area of the fluidized bed 2, assuming a constant fluidization velocity. Thus, a ratio of D:H of 1:2 proves to be a minimum requirement. The greater the height H of the fluidized bed—and hence the solid content compared with the diameter D of the outlet orifice 3, the better is the homogeneity of the fluidized bed 2 and hence the prehomogenization of the gas/solid stream.

Greater heights H of the fluidized bed furthermore have a damping effect on vibrations which result from the feeding of the solid particles into the fluidized bed via, for example, a metering screw 21.

The ratio of metering fluctuations of the solid mass flow $\char`\^m_{ss}$ fed into a fluidized bed 2 via a metering screw 21 to metering fluctuations of a solid mass flow $\char`\^m_{SD}$ emerging via a hollow body 5 can be represented by the relationship:

$$\frac{m_{SS}}{m_{SD}} = \frac{2(H+L)\pi f \rho_S (1 - \epsilon_{WS}) A_{WS}}{m_S} \quad (1)$$

where H is the height of the fluidized bed, L is the length of the hollow body 5, $\epsilon_{WS}$ is the porosity of the fluidized bed, $A_{WS}$ is the area of the fluidized bed, $\rho_S$ is the density of the solid, f is the speed of the metering screw and $m_S$ is the mean solid mass flow emerging from the outlet orifice 3.

The provision of further pressure measuring points 12a to 12d permits, on the one hand, monitoring of the porosity and homogeneity of the fluidized bed 2 via measurement of the pressure difference within the fluidized bed 2 (as measured at 12a and 12b). On the other hand, a pressure loss above the bottom 11 can be measured via pressure measuring points 12' and 12c which are arranged just above and just below the bottom 11 of the fluidized-bed apparatus 1 so that possible blockages of the porous bottom 11 can be detected in good time. A further pressure measuring point 12e may additionally be provided above the fluidized bed 2 for monitoring the solids content of the fluidized bed 2. Measurements of the pressure difference are advantageously made here too.

To prevent fine solids of the fluidized bed 2 from settling on membranes of the pressure sensors, small, fine, porous plastic filters are preferably provided, or penetration of solid particles is impeded by flushing the pressure pipe with a gas.

Measured data based on measurements of the homogeneity in the fluidized bed 2 can serve for regulating the homogenization of the fluidized bed 2, on the one hand, and of the outflowing gas/solid stream, on the other hand, both via adjustment of the inflow velocity of the fluidizing gas and via introduction of additional fluidizing gas either through the fluidizing nozzles 6 and, in particular, through the porous walls 7 or through holes 9 in this wall (FIG. 3a and 3b).

In the event of large deviations of the solid mass flow, correction is not possible by additional gas introduction alone. As described above, coarse regulation may be effected via the height H of the fluidized bed 2 or, with a constant height H, via an increase or reduction in pressure above the fluidized bed 2. The height H of the fluidized bed 2 is kept constant via a level sensor 12f, 12', respectively, which controls the feed of solids by the metering screw 21 via the programmable logic controller 34, while measured data obtained at the two pressure measuring points 12 and 12' determine the pressure in the space above the fluidized bed 2 via the programmable logic controller 34. A pneumatic pipe 31 which enters a cover 32 or hood of the fluidized-bed apparatus 1 and whose valve 33 may be controlled for this purpose. The pressure measuring point 12e may be provided above the fluidized bed 2 for monitoring the pressure or, to function instead of the level sensors 12f, 12' for regulating the solid feed via the metering screw 21.

Thus, a plurality of regulating or control mechanisms are available to achieve the accuracy desired as well as rapidness of metering, the combination of such mechanisms and measures, or their individual use will result in a large control range and excellent flow characteristics.

Regulations and controls which take place via the fluidized bed are, of course, sluggish and, for the applications mentioned at the outset, determine only the control range itself.

The fact that parameters such as the diameter D of the hollow body, the length L of the hollow body or the area A of the fluidized bed determine the flow state of the gas/solid stream flowing out into the outflow pipe 4 has become known from the investigations mentioned at the outset and is also evident from equation (1).

FIG. 3a and 3b shows two examples of a hollow body 5. Accoding to FIG. 3a, it has a cylindrical internal diameter; introduction of gas into the gas/solid stream takes place via a narrow, annular sintered insert 9a, which in turn is surrounded by a gas introduction channel 8a. A pressure measuring hole defining the pressure measuring point 12 is provided close to the outlet orifice 3. In this case, no fluidizing nozzles 6 (FIG. 2) are provided. An outer edge or collar 27 around the outlet orifice 3 prevents bubbles from being drawn into the outflow pipe 4.

The outflow pipe 4 generally has a larger diameter than the hollow body, as is also evident from FIG. 3a. The stabilization and homogenization effected via metering means 18 in accordance with the invention (FIGS. 1 and 2) is also maintained in the outflow pipe 4 if the gas/solid stream is surrounded by a fluid jacket, as is possible by coaxial gas introduction via the nozzle 28 (FIG. 1) just above the metering device 18.

Bubbles are substantially prevented from rising in direction of the fluidized bed, thus, adversely affecting the homogeneity, even when relatively large amounts of gas are introduced via the holes 9b, by the slightly convergent inflow region of the hollow body 5b of FIG. 3b and by the arrangement of gas introduction holes 9b in the transition region of the cylindrical internal diameter of the hollow body 5b, these holes 9b being slightly inclined from the horizontal toward the outflow pipe 4. Here too, the pressure measuring point 12 is preferably close to the outlet orifice 3.

Figure 4:
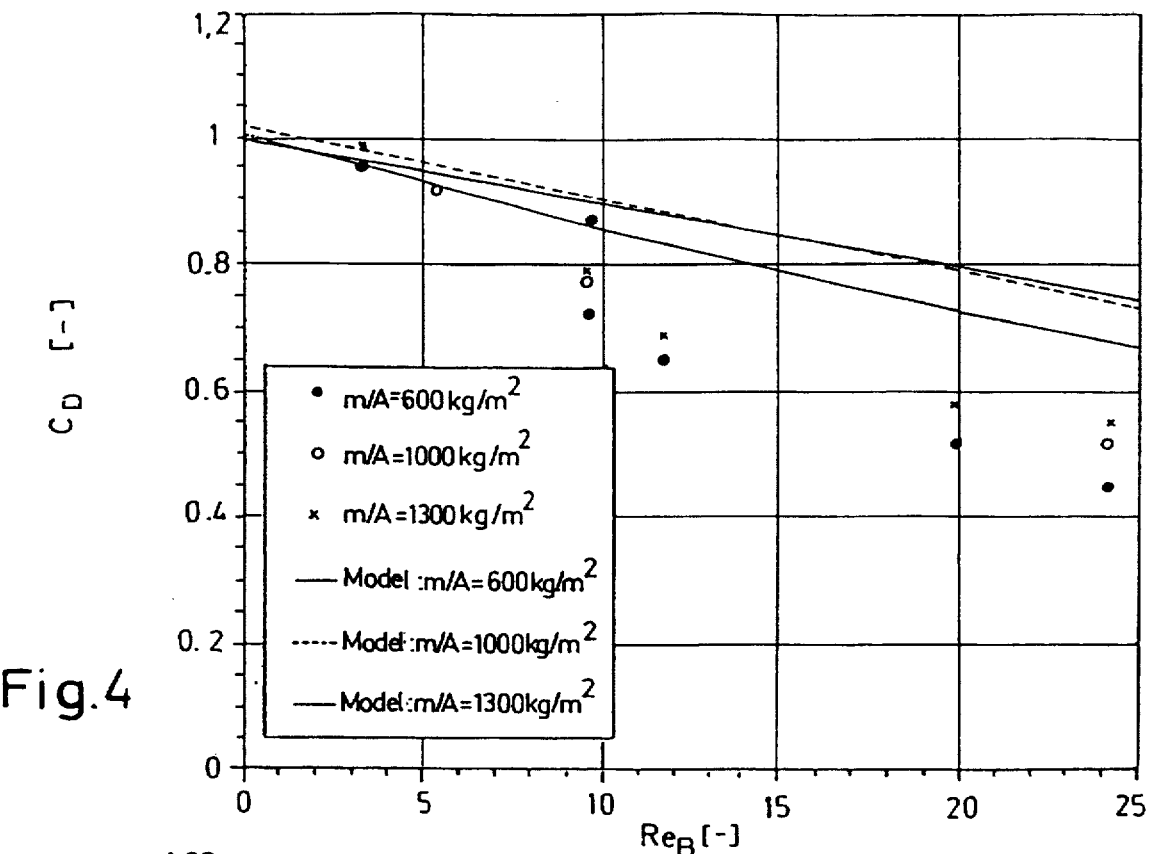
FIG. 4 shows the dependence of a solid mass flow on additional introduction of a gas.

FIG. 4 shows the effect of gas introduction on the solid mass flow by way of example. The extent to which the solid mass flow decreases with increasing air introduction is shown in dimensionless form for a diameter of 20 mm for the outlet orifice 3 and for glass spheres having a means particle diameter of 74 µm. A sudden decrease in the solid mass flow at a Reynold's number of $Re_B=9$ is evident. From this Reynold's number onward, the jet becomes unstable.

Here, homogeneous, steady-state metering functions only up to a Reynold's numer of 9. The coefficient of discharge $c_D$ is obtained from the theoretical discharge equation for the solid jet:

$$c_D = \frac{m_S}{\rho_P(1 - \epsilon_{WS})A_D \sqrt{g(H+L)}} \quad (2)$$

where $m_S$ is the measured solid mass flow, $\rho_P$ is the particle density, $\epsilon_{WS}$ is the mean porosity of the fluidized bed, $A_D$ is the cross-section of the hollow body, g is the gravitational constant, H is the height of the fluidized bed and L is the length of the hollow body.

$Re_B$, the Reynold's number, is defined in terms of the empty pipe air velocity $$u_{1b}\left(\frac{V_B}{A_D}\right)$$

of the additionally fed in gas in the nozzle and the particle diameter $d_P$ as in the case of fluidized beds, where $V_B$ is the gas volume flow of the gas introduced.

$$Re_b = \frac{V_B \cdot d_P}{A_D \cdot v} \quad (3)$$

Figure 5:
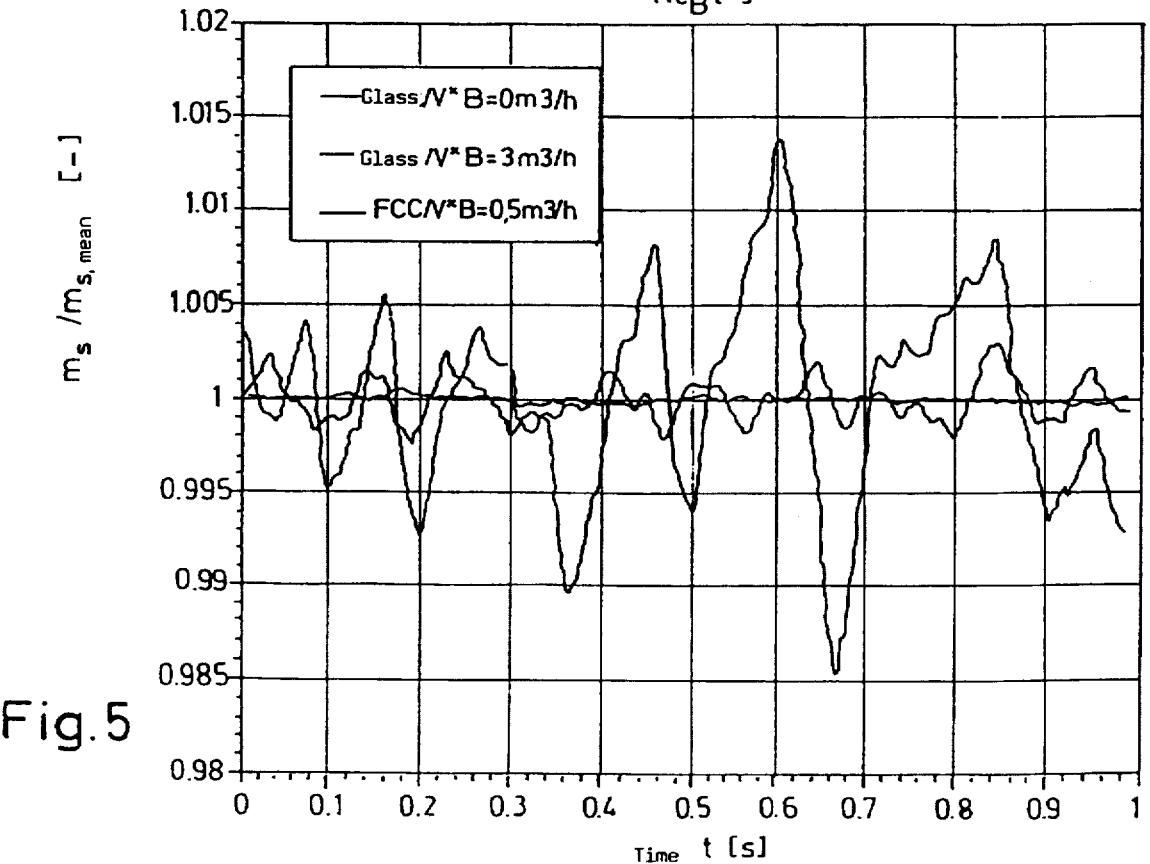
FIG. 5 shows metering fluctuations at the outlet of a gas/solid jet from a fluidized-bed.

FIG. 5 shows metering fluctuations such as those which occur on emergence of the gas/solid stream from an experimental fluidized bed on a pilot scale in case of fluidization just above the incipient fluidization point, atmospheric pressure above the fluidized bed and a fluidized bed of 1 m in height. In the stable range of the jet, the short-term metering fluctuations are below 0.59% for glass spheres and below 0.69% for a fluid cracking catalyst. This may be compared with the unsuitable metering fluctuations of the unstable gas jet for glass spheres. Metering fluctuations up to a frequency of about 30 Hz were measured with a piezo differential pressure sensor.

Figure 6:
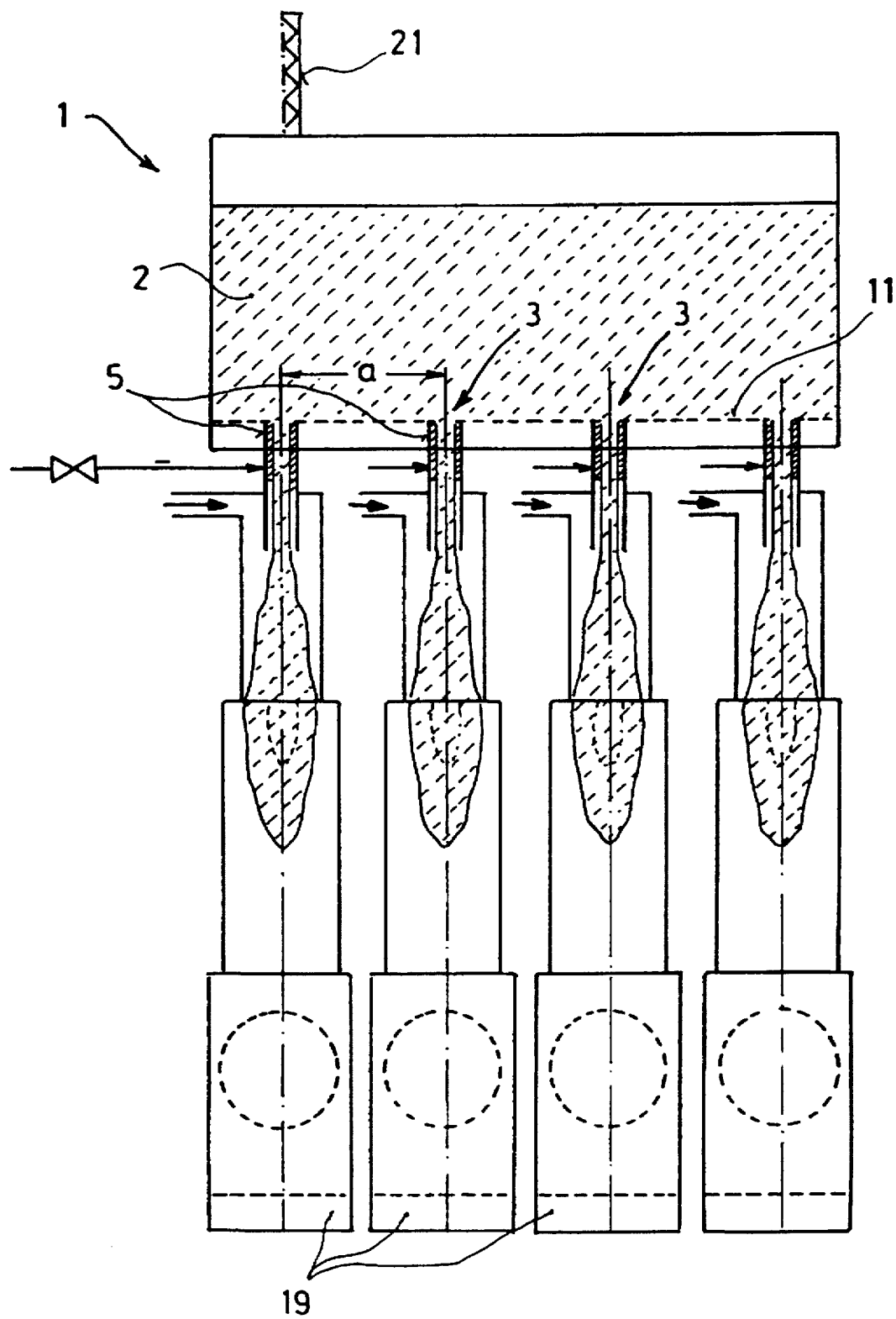
FIG. 6 shows an arrangement for loading a plurality of reaction spaces.

FIG. 6 illustrates, by way of example, the procedure of loading a plurality of reaction spaces 19, a gas/liquid stream being taken off from a fluidized bed 2 via a plurality of outflow orifices 3. Hollow bodies 5 are each associated with one of these outflow orifices 3. Thus, the outflowing gas/solid stream may be additionally supplied with gas, in the manner described above, via such bodies 5 so as to meter individual (and, if necessery, differing) quantities into each one of the reaction spaces 19. Moreover, the optional choice of using and operating different numbers of outlet orifices to charge a common reaction or treatment space makes it possible to establish a wide metering range and to keep handling more flexible.

If a plurality of outlet orifices 3 are to be provided in the fluidized-bed apparatus 1 for charging a plurality of rection spaces 19, the position of said orifices and the mutual relative position in the bottom 11 of this apparatus 1 has to be taken into account in order to avoid disturbances due to overlapping of the particular entry zones, because otherwise the effect of the arrangement shown would be limited. For example, in the case of a series arrangement of the outlet orifices 3, the mutual spacing a between the outlet orifices 3 will correspond approximately to the distance from the outlet orifices 3 to the lateral limits of the fluidized-bed apparatus 1. In the case of of a fluidized-bed apparatus of circular cross-section and, thus, having a circular bottom plate 11, the majority of outlet orifices 3 should preferably be arranged at the center of the circular bottom, and the mutual spacing of the outlet orifices 3 should at least equal their diameters. Alternatively, if a non-central arrangement of the majority of outlet orifices is desired, a sufficient distance should be maintained from that edge of the fluidized-bed apparatus 1 which borders or defines the fluidized-bed 2, as explained above.

Figure 7:
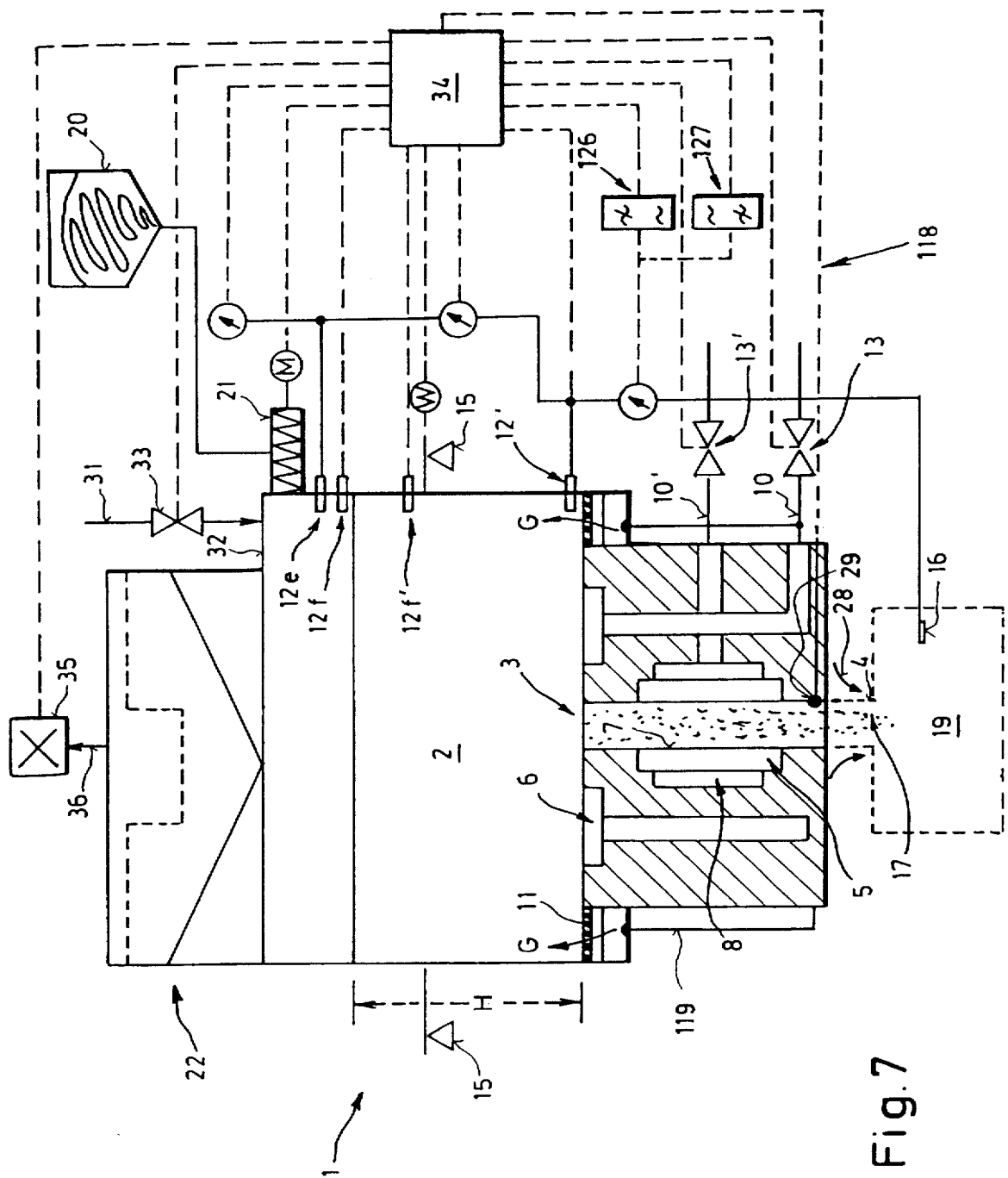
FIG. 7 illustrates another embodiment of a control arrangement of a fluidized-bed according to the invention in a view similar to FIG. 2.

FIG. 7 shows an alternative embodiment for the control of a fluidized-bed 2, and, in addition, a special application of such a metering arrangement, particularly for a dosing critical and difficult material tending to form lumps, as, for example, fly ash. Parts of the same function as in the previous embodiments will have the same reference numeral so that a repeated description of those parts is not necessary.

As in the example of FIG. 2, material to be metered and treated is fed from storage container 20 via a predosing mechanism such as metering screw 21 into the fluidized-bed apparatus 1. The storage container 20 may be, for example, part of a separating and conveying system as described in EP-A-0 168 614. Again, there may be a conventional loosening device in the bottom part of the storage container 20 for facilitating free flow of the material out of the container 20. The rotational speed of the screw will be chosen in such a manner not to affect the fluidized bed 2 by pulse-like forces exerted by the particles fed in.

Fluidizing gas G flows through a feed line 119 opening below the bottom plate 11, and streams from there in upward direction through the porous plate 11 to form the fluidized bed 2.

Control of outflowing solid mass stream out of pipe 4 can be made by a throughput sensor device 29 of any conventional type, e.g. either measuring a differential pressure in a delay line or using another contactless measuring principle, at the exit of the hollow body 5 or afterwards in the adjacent region. Another possibility to determine the throughput is the use of a conventional flow detector, for instance, of the type operating in accordance with the Coriolis principle.

The output signals of this sensor 29 are supplied to the programmable logic controller 34, thus resulting either in a corresponding control signal to control either valve 13' and/or 13 to adjust the amount of gas supplied to gas channel 8 and/or nozzles 6 or plate 11 and/or to adjust the supply rate of solids by screw 21.

A further control facility is given by presure sensor 12e which may be used, e.g. together with sensor 12f, to provide a differential pressure signal to give the pressure between two different upper levels of fluidized bed 2. It is, however, preferred to combine the signals of sensors 12e and 12', the latter indicating the pressure in the bottom region. Optionally, differential pressure may also be determined between the sensors 12' and 12f' and/or 12f. The control may then be effected in a similar way as described above with reference to the function of sensor 29.

Furthermore, the outflowing gas/solid stream from the pipe 4 is to be introduced into the treatment space 19 which can, in many cases, only be done when the particular conditions, such as pressure, within that space 19 are known. To this end, at least one appropriate sensor, such as a pressure sensor 16, may be arranged so as to be able to determine the conditions within the space 19.

Now, it is possible to compare the output signal of pressure sensor 12' within the fluidized bed 2 which determines the pressure approximately at the level of the outlet orifice 3 with that of sensor 16 within the reaction or treatment space 19. Thus, a differential signal will be obtained which is representative for the driving force urging the gas/solid mixture out of the fluidized bed 2 and causing entrance of this mixture into the reaction space 19.

It should be noted that it is not preferred to arrange the sensor 12' immediately in the region of the outlet orifice 3 where the gas/solid mixture is drawn in so as not to disturb this flow. It is only essential that the pressure sensor 12' is at the level of the outlet opening 3. This can be a higher level than that of the bottom plate 11, if the outlet orifice is provided with a collar 27 or is otherwise protruding into the fluidized bed 2.

In dependance upon nature and progress of the treatment process within reaction space 19, conditions may change. Thus, in some cases, it might not be sufficient to monitor the pressure if solids have to be charged in predetermined amounts of high precision. For example, changes of density of the solids may occur due to chemical processes or by degasification which already could take place within the fluidized bed, if desired, at least in part.

In order to determine the mass content of the fluidized bed 2, it would, for example, be possible to use load measuring cells 15 onto which the apparatus 1 is supported. Of course, other measuring devices and arrangements would be possible. Measuring the mass content of the gas/solid mixture is preferably effected according to the differential weighing method where weighing is effected in intervals to determine the difference over time. Output signals of these cells 15 are fed to the programmable logic controller 34. Controller 34 may control the supply of solids via metering screw 21.

During such weighing periods charging of the fluidized-bed apparatus by metering screw 21 will be interrupted. An alternative method may consist in weighing only during those times when the level of the fluidized bed 2 is between a predetermined upper level and a predetermined lower level, i.e substantially at a predetermined level. Such level may be determined by appropriate level sensors such as pressure sensors 12e combined with 12f (or with 12f'), but it is preferred to use the sensors 15 for gravimetrically determining the level of the fluidized bed 2. In any case, the height H of the fluidized bed 2 may be adjusted to a predetermined level which may be controlled by sensors 12f, 12f' which act then as level sensors for an upper and a lower level. In this way, material outflowing during the stops of screw 21 may afterwards filled up to the predetermined level, for example.

In case of lowering height H of the fluidized bed 2, pressure above this bed 2 may be adjusted, i.e. diminished or increased. To this end, a pneumatic line 31 as well as an adjustable limiter device 35 for limiting the throughput through the line 31 is provided which opens into the cover 32 of the apparatus 1. Thus, it would be possible to control the pressure above the fluidized bed 2 by this limiter device 35 alone. There is also either a valve 33 or another device for controlling gas input or output, such as a sucking or pressurizing fan or a gas pump which, in turn, is controlled via output signals of the pressure sensor 12e.

Fines which are blown upwardly and out of the fluidized bed 2 are separated by a dust filter arrangement 22 or a cyclone (which is preferred), and is optionally fed back into the fluidized bed in a manner not shown but known per se.

As has been stated in the outset, either quick or slow fluctuations of the exiting mass stream of solids are possible. Each one of the control facilities or any combination of them has, of course, another control characteristic. Therefore, a sieving circuit, comprising, for example a low pass filter 126 and/or a high pass filter 127, may be used at the output of the programmable controller 34 in such a manner that in case of slow changes the solid supply via metering screw 21 and/or the supply of fluidizing gas into the fluidized bed 2 and/or supply of gas into the space above the fluidized bed 2 is adjusted, while with quick changes supply of gas to the gas nozzle 5 (or 28) succeding the outlet orifice 3 will be altered.

Figure 8:
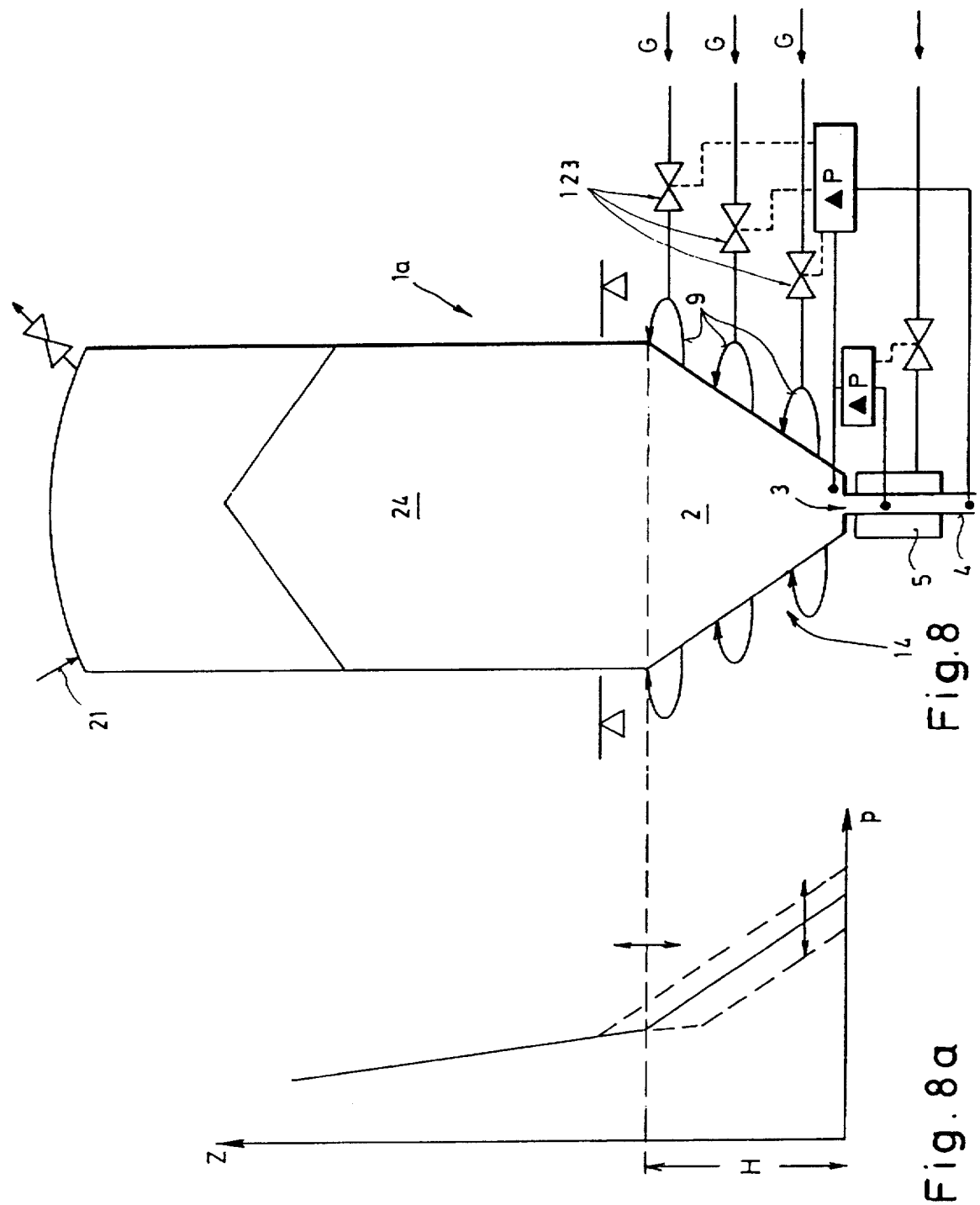

FIG. 8 shows a fluidized-bed apparatus 1a, the lower portion of which is formed as a funnel 14. Solids are fed via a supply device 21 (only schematically illustrated), while fluidizing gas G is introduced into the funnel 14 through annular lines 9. Instead of outer annular lines, it would also be possible to use lines 25 (FIG. 9) protruding into the interior of the fluidized bed which will cause a more favorable fluidization of solids introduced into the funnel 14. The walls of the funnel may be separated into horizontal regions or parts at least in part, e.g. in the manner shown in FIG. 1 of WO 89/11378. Each horizontal region comprises a jacketed structure, the inner wall of which being gas permeable.

In this way, fluidizing gas may be introduced at differing rates and amounts in each one of the horizontal stratas of the, funnel 14. Amounts and/or rates may be controlled by valves 23 provided in the annular lines 9. This enables to control the height H of the fluidized bed 2 which, in this case, is covered by a fixed bed 24. Height H will also depend upon the mass or weight of the fixed bed 24 so as to give a further possibility for adjusting the height H by control of the height or weight of the fixed bed 24.

As may be seen from the graph of FIG. 8a, pressure prevailing at the level of the outlet orifice 3 will depend upon the height H of the fluidized bed 2, i.e. upon the level of the interface between fluidized bed 2 and fixed bed 24. The more fluidizing gas is introduced per time unit, the more this interface will be displaced upwardly, and the greater the pressure will be which prevails at the level of the outlet orifice 3. In this way, the driving force for driving the gas/solid mixture out of line 4 may also be varied; the advantage is that due to the reduction of cross-section towards the bottom of the funnel 14 a smaller amount of fluidizing gas will be necessary. Control of outflowing gas/solid stream may either be effected according to the methods and ways described above and/or by acting on the valves 23 in the annular lines 9. If the supply of fluidizing gas would be stopped, no fluidized region would be present in the apparatus 1a, i.e. solids are all in a fixed bed, ordinarily without any outflow of solids. In a similar way, outflow of solids can be reduced or even stopped in an apparatus according to FIGS. 1 to 7, if a sufficient subpressure is built up above the fluidized bed 2.

Figure 9:
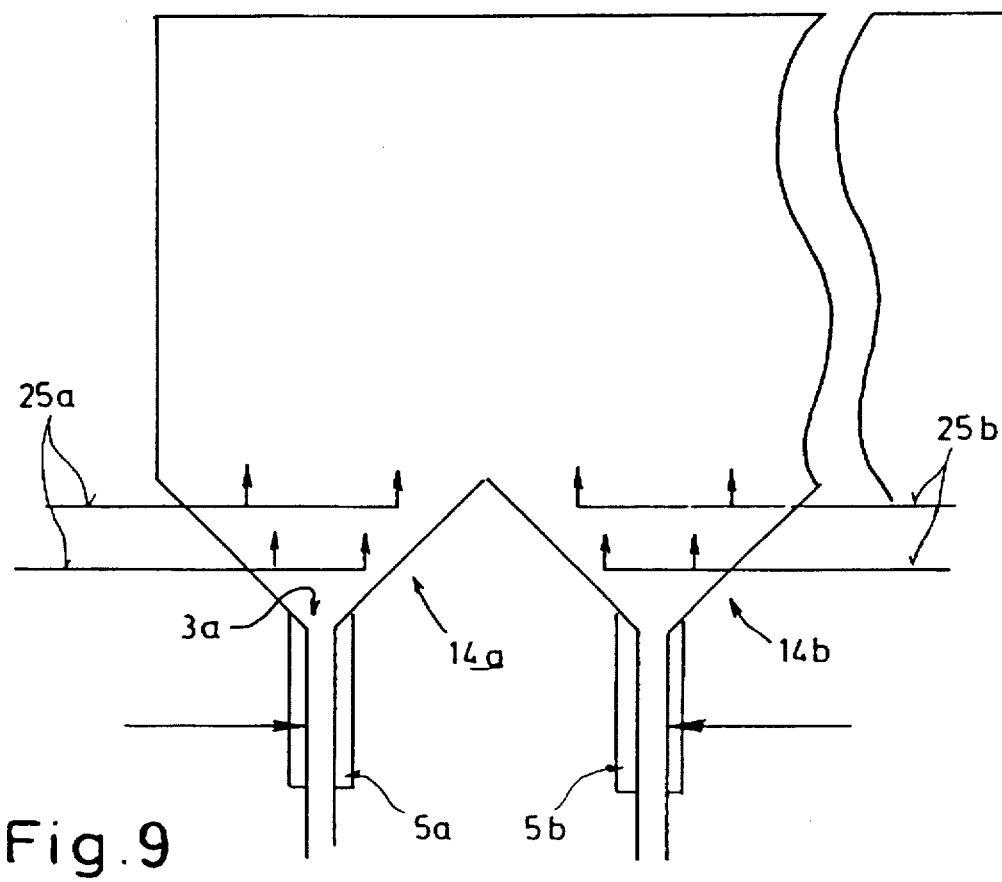
FIG. 9 represents a further embodiment of a fluidized-bed apparatus with several funnel-shaped regions.

FIG. 9 shows an apparatus comprising a plurality of funnel-shaped configurations 14a, 14b, etc. Fluidizing gas is supplied to each one of those funnels 14a, 14b, etc. through separate lines 25a, 25b, etc. Thus, the respective level for each of the funnels 14a, 14b, etc. is adjustable independently from each other. In this way it is possible to control the amount of solids exiting each of the funnels 14a, 14b, etc. through the respective outlet openings 3a, 3b, etc. Moreover, a further control facility exists by the use of the individual gas supply nozzles 5a, 5b, etc. which are assigned to each of the outlet orifices 3a, 3b, etc., particularly to control quick and/or small fluctuations of the exiting gas/solid stream, as has been described in connection with the foregoing Figures.

The individual outlet orifices 3a, 3b, etc. may either be connected to a single reaction space 19 (see e.g. FIG. 7) or may feed different treatment spaces so as to supply an individual amount of solids to each of the reaction spaces.

Figure 10:
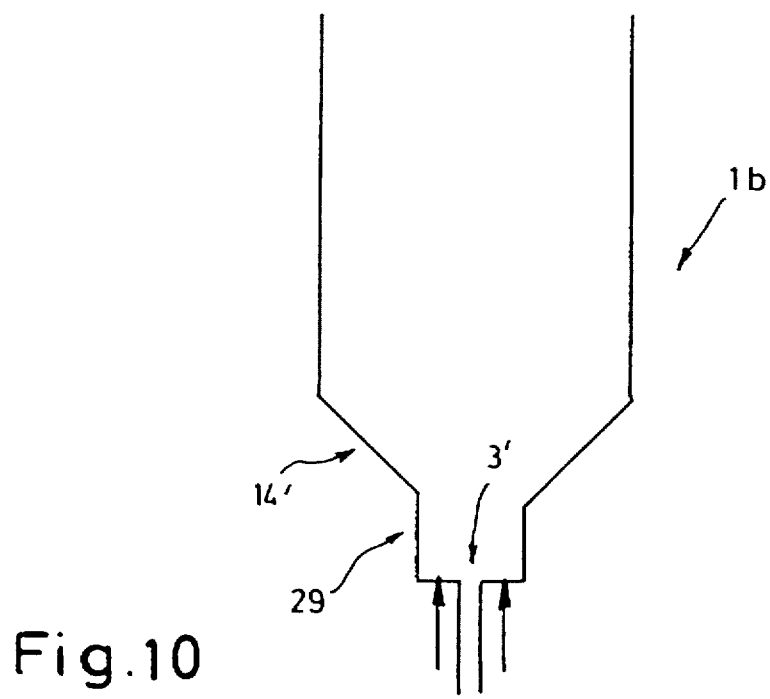
FIG. 10 shows a modified embodiment of a fluidized-bed apparatus having a funnel-shaped region.

The fluidized-bed apparatus 1b of FIG. 10 differs from that of FIG. 8 in that the funnel 14' opens into a relatively narrow cylindrical section 29 at the lower end of it, this section comprising the outlet orifice 3'. In this way a combination of the advantages of a fluidized-bed apparatus according to FIGS. 2 or 7 (cylindrical) with one according to FIG. 8 (funnel-shaped) will be achieved. This is due to the fact that the cylindrical section 29 enables a controlled fluidization within the problematic region of the outlet orifice (as dicussed above), while the funnel-shaped section 14' enables the simultaneous use of a fluidized bed and a fixed bed as described with reference to FIG. 8.

Figure 11:
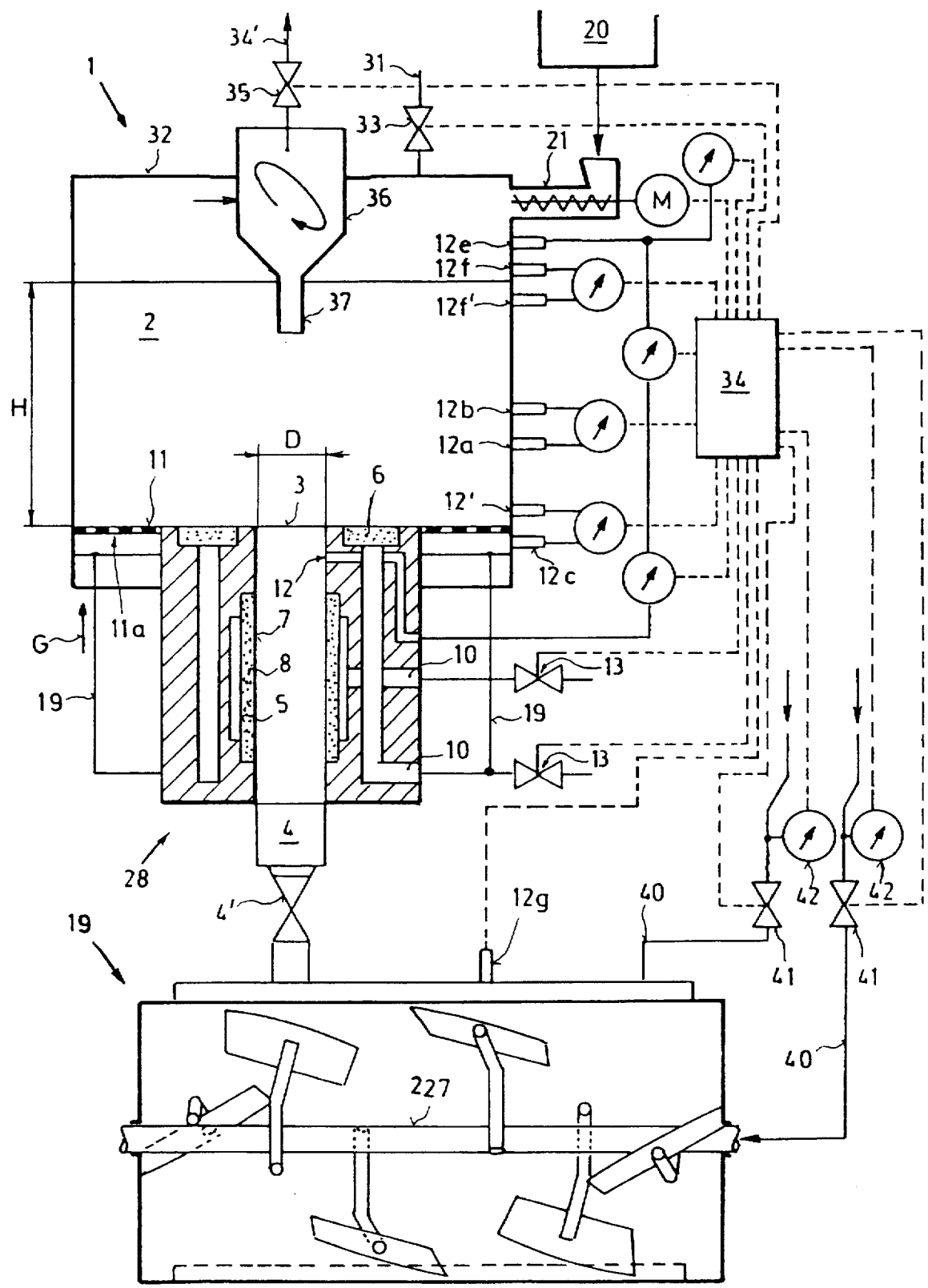

Now, with reference to FIG. 11, a practical application of the metering device, given by way of a non-limitative example, will be described. According to this embodiment an apparatus 1 is used which is similar to that of FIG. 2, although the application is not restricted to such a combination.

Since the exiting gas/solid stream is in a fluidized condition, each particle will present its outer surface free from adhering particles. This is a situation which provides an optimum for admixing another material, especially a liquid. For example, such liquid may be spread over the free outer surface of the particles. Such type of mixing is particularly useful, if the solids tend to adhere to each other so as to form aggregates or even larger lumps as is the case, for example, with flyash.

For the latter case, EP-A-168 614 suggests a dense phase or plug conveying system for conveying the contents of the vessel 20 to the screw 21. It may be noted that in case of admixing a liquid to the solids introduced into the fluidized bed 2 by screw 21, the fluidizing gas introduced through line 19 may be just a stream of the liquid to be admixed so that the outer surface of the particles has already been moistured with the liquid before they are leaving the apparatus 1. On the other hand, the gas intruduced via nozzle arrangement 28 may either be the same or another one. Dry gas supplied by nozzle arrangement 28 is preferred.

As explained above, admixing of any material be made, in part, within the fluidized bed 2 or, alternatively, in the outlet region of the nozzle arrangement 28 or immediately subsequently as long as the gas/solid mixture from the fluidized bed 2 is still in fluidized condition. In the present embodiment, there are two liquid supply lines 40 which may be used either both or alternatively. Thus, it would be possible to introduce a steam into the fluidized bed 2 and/or into the nozzle arrangement 28 and/or through spraying nozzles at the top of the mixer and(or through a hollow mixer shaft 227 which has radially opening fluid spraying openings (not shown).

At least one of the liquid supply lines 40 comprises an adjusting device for controlled introduction of a desired amount of liquid into the mixing compartment 19. Such an adjusting device may be formed by an appropriate adjustable valve 41 or a pump. It may be useful, in addition to provide means for determining the actual throughput of liquid through at least one of the lines 40. Measurement of throughput may be effected by any means known in the art such as magnetic-inductive meters, ultra-sound meters and the like. It would also be possible to operate such a meter only temporarily, for instance for preadjusting a basic position of valve 41. In any case, the measurement of the throughput of liquid would affect the respective position of the adjustable valve 41 (or the throughput of a corresponding variable pump).

The arrangement shown may either be operated continuously, semi-continuously (as mentioned above in connection with FIG. 7, when stopping the screw 21 periodically) or in a batch mode. The latter form of operation is espacially suited for flyash, because this material is frequently removed in quite different quantities per time period.

It is clear that the mixing compartment and its inner arrangement may be varied without departing from the scope of the invention. Also, it would be possible to employ a fluidized-bed apparatus 1 according to FIG. 7 which has a gravimetric dosing system using load cells 15. As in FIG. 7 where a sensor 16 is used in the reactor space 19, a pressure sensor 12g could be arranged and used to control (particularly by comparison with the respective output signal of pressure sensor 12f) the pressure above the fluidized bed 2 via controller 34 and a valve 33.

Figure 11A:
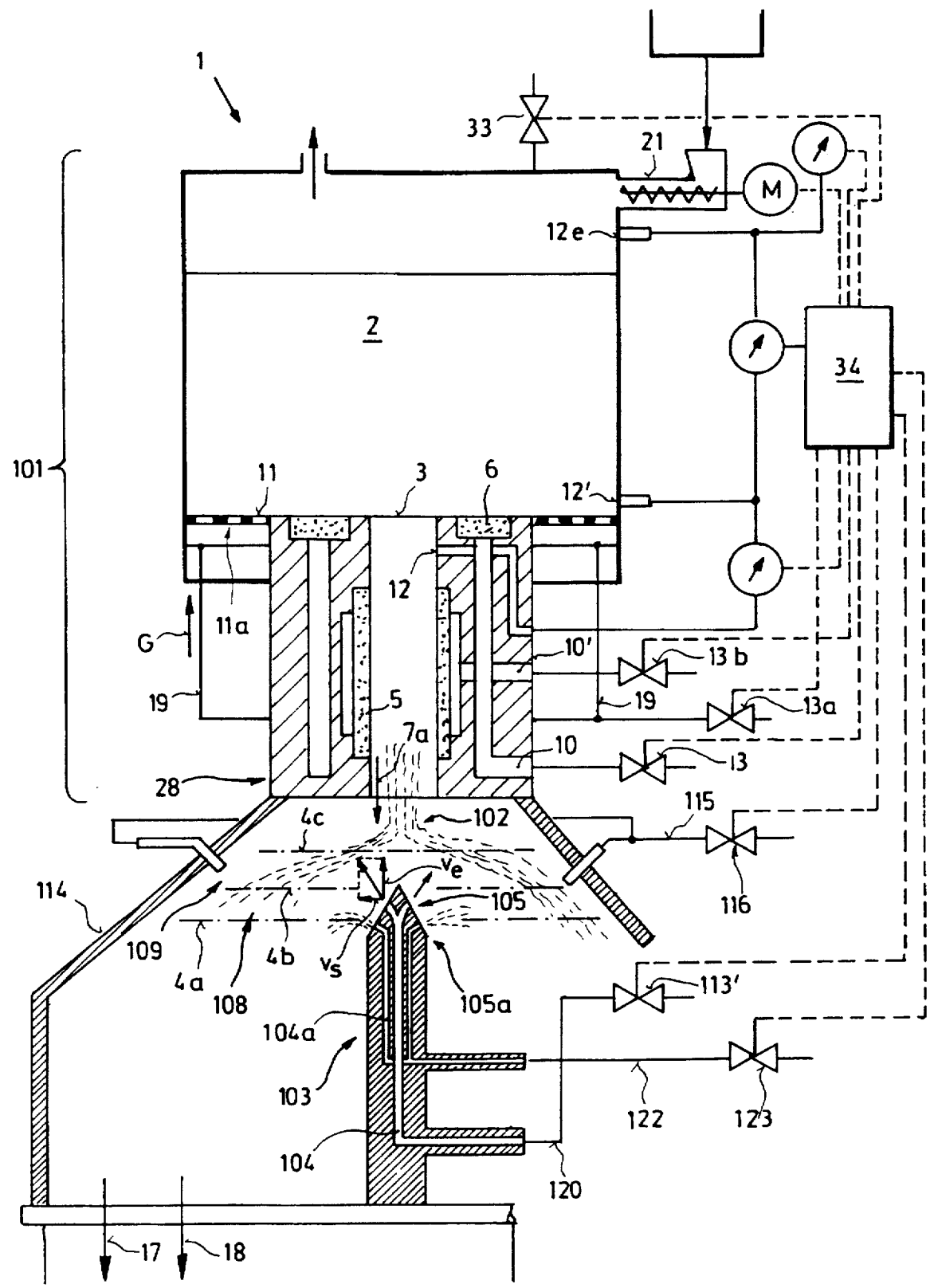

In FIG. 11a a simplified form of apparatus 101 is shown which has only two sensors or measuring points 12e and 12'. It is, however, understood that likewise any other arrangement could be used to replace the apparatus 101. It is true that fluidizing provides a maximum free outer surface of the particles exposed to a sprayed liquid. However, since the particles are present in a cloud-like form, it may be that one particle hides a surface of another particle which is behind with respect to the direction of sprayed liquid. FIG. 11a shows a method for further spreading the solids so as to obtain a single layer of individualized particles.

The gas/solid mixture exits from nozzle assembly 28 as a stream 102, hereinafter referred as the "solid stream" for the sake of simplicity, although also a gas or a liquid may be admixed in accordance with the nature of the process and the form of admixing a fluid.

Below the nozzle assembly 28, there is another nozzle member 103. Nozzle member 103 may be of prismatic or cylindrical shape and, in this embodiment, comprises two channels 104 and 104a which are connected to a source of fluid not shown. It should be understood that, although two channels 104, 104a are shown, more than two channels could be used which may be arranged radially symmetrically with respect to the longitudinal axis of the nozzle member 103 so as to be, preferably, angularly equally spaced when seeing the nozzle member 103 from above. Nevertheless, it would also be conceivable to have a single (for example, centered) channel with a plurality of orifices 105 at the top of nozzle member 103. The number and arrangement of nozzles and orifices will be discussed later with reference to FIGS. 14, 14a–14d and 17, 17a and 17b.

At least one of the channels 104, 104a, preferably that whose orifices 105 are closer to the dosing apparatus 101, will supply a fluid, preferably a gas, to be blown against the solid stream 102 under control of an inlet valve 13'. In this manner, the stream 102 will be widened and, with a symmetrical arrangement of the orifices as mentioned above, will fan out to an umbrella or mushroom shape 108. In this way, A veil of solids of predetermined and controllable thickness will form in dependency upon the amount and rate of the fluid supplied by the orifices 105 (possibly with respect to the amount and rate of the solid stream exiting from nozzle assembly 28). Thus, more particles will present their outer surfaces directly to the outside of the "umbrella" 108.

Specifically, as will be seen from FIG. 11a, the solid stream 102 is impinged by the fluid of nozzle member 103 in such a manner that a speed component $v_e$ of the fluid is opposed to the direction 7a of the solid stream 102 and/or that one speed component $v_s$ of the fluid is perpendicular to the direction 7a. In this way, it will be possible to maintain a uniform distribution of concentration of particles over the circumference of the "umbrella" or solid's veil 108. In practice, the concentration distribution will be dependent upon diversification of directions of fluid (if any) exiting the orifices 105 and/or upon the amount and the rate or velocity of exiting fluid, in cases also upon the quality of the solid stream 102 and can be uniform over the whole "umbrella" 108 or, at least, uniform over partial regions of it which may be dined by horizontal planes 4a, 4b and 4c extending perpendicularly to the direction 7a of the solid stream 102.

The free end of the nozzle member 103, at its top, is suitably conically tapering so as to avoid any interaction between the solid particles of stream 102 and the nozzle tip which may result in an abrasion of the latter.

There are some other orifices 105a (or at least one) at the end of channel 104a. It is possible to supply also fluid, particularly a gas, over this orifice 105a to improve fanning out of the solid stream 102. Alternatively (and preferably), a treatment medium, such as a liquid, may be spread onto the surfaces of the particles of the solid stream 102. From the foregoing description it is clear that such liquid can also form the fluid for widening the stream 102 and forming the "umbrella" 108. While the orifices can be used to spray a treatment fluid onto the inner surfaces of the umbrella 108, there may be some other nozzles 109 arranged in a housing 114 at the radial outside of "umbrella" 108 to spray a treatment fluid from outside. Preferably, to equalize treatment of the solids, the treatment fluid through nozzels 9 is spread in a uniform manner. To this end preferably a plurality of nozzles are arranged around the direction 7a of the stream 102. Alternatively a single annular nozzle (or several sector-shaped slit nozzles) 9 may be provided. The fluid supplied by nozzles 9 (which, in most cases, will be the same as supplied by orifice(s) 105a, if necessary) is fed to the nozzles through a line 115 including an input valve 116.

The solids, thus treated, will be withdrawn as a stream 17, whereas the excess of treatment medium as well as some other gas or fluid as a, suitably separated, stream 18 merely diagrammatically indicated. Alternatively a single discharge line can be provided for conveying both the solids and the fluids.

It is clear that there may be controllable valves 13' and/or 123 in lines 20 and 22 leading to the channels 104 and 104a. These valves may be controlled by programmable controller 34 to achieve a desired treatment procedure.

Those skilled in the art will recognize that the principle embodied by the nozzle member 103 for forming an "umbrella" of particulate solids is widely applicable to improve uniformity of any treatment. The following description is intended to show some useful applications and modifications.

Figure 12:
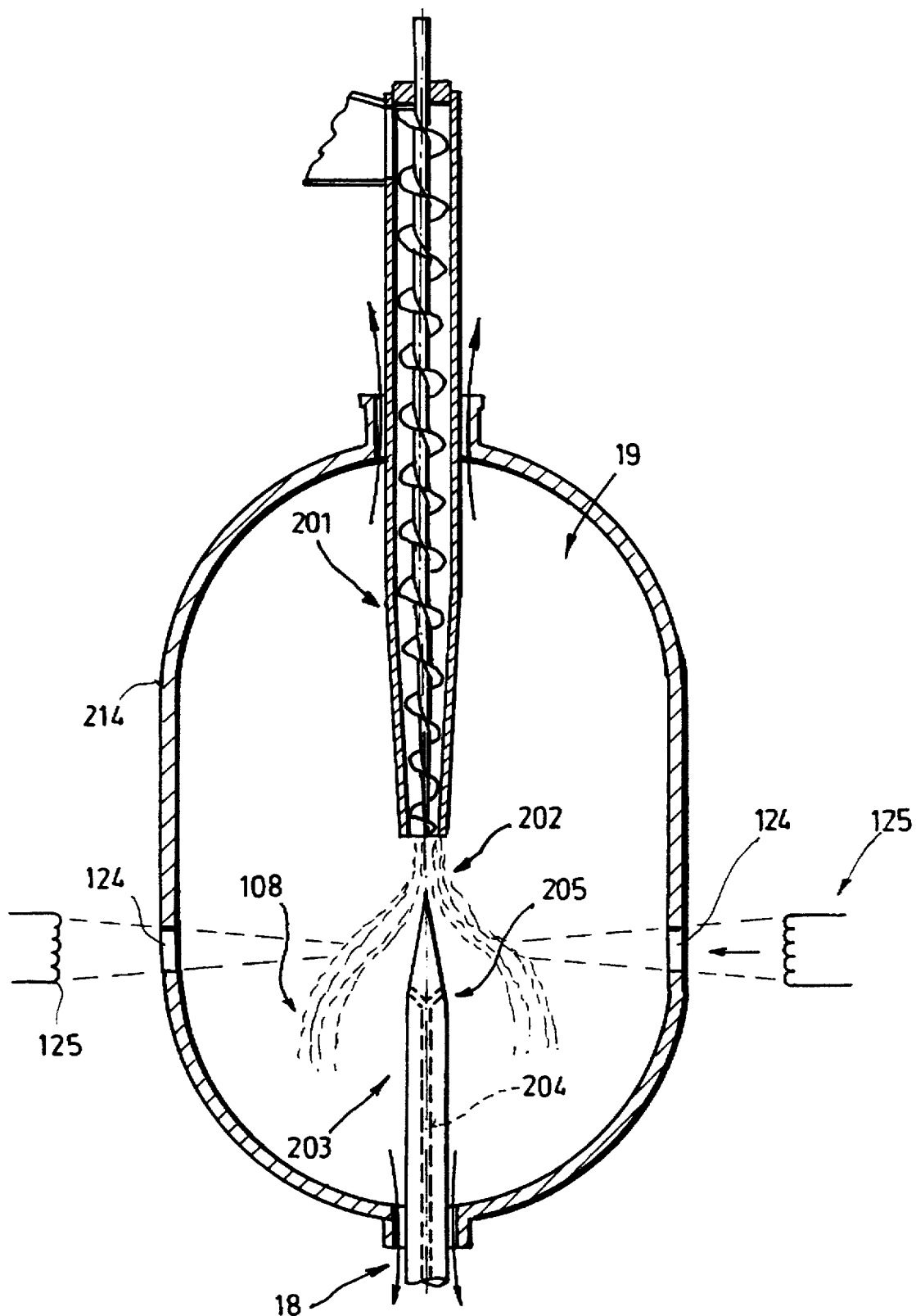
FIG. 12 depicts an alternative arrangement for controlling spacial distribution.

In FIG. 12, there is a metering screw 201 instead of the fluidized bed apparatus 1, 1 or 101 which, for most applications, is preferred, because an exact time constant supply will not be possible with such a screw 201. From metering screw 201 a solid stream 202 exits into a reaction space 19 enclosed by a housing 214. Below the screw 201 and the stream 202, there is a similar nozzle member 203 as described with reference to FIG. 11a, thus, comprising a channel 204 with plural orifices 205. In this way, a widened stream portion 108 is formed which, in this case, preferably has not the shape of an umbrella or mushroom, but is symmetrical with respect to a plane perpendicular to the plane of the drawing for reasons explained later.

Since fluid or gas is blown into the space 19 by nozzle member 203, there is a slight over-pressure which would increase more and more. To avoid such increase in pressure, there is an annular space between the nozzle member 203 and the housing 214 which forms an opening to allow protrusion of the nozzle member into the space 19 from outside. In this annular space a gas stream 18 will form. In a similar way, the housing 214 has an opening for entrance of the metering screw 201 and an annular space around the screw 201, thus allowing exit of gases.

Moreover, the housing 214 has (at least) two window openings 124 for entrance of some treatment radiation from outside, for example from two sources of radiation 125. Window openings may be uncovered without any detrimental effect, because of the slight over-pressure in the space 19 which prevents ambient air from entering the space through the windows (or the annular openings discussed above). This has some advantages, because any cover of the windows (permeable for the radiation of sources 125) would attenuate the radiation send out by sources 125. Moreover, since the particles introduced by screw 201 may contain a certain proportion of dust which could deposit on such window cover, the problem of dedusting such covers is avoided.

The radiation and, therefore, the radiation sources 125 may be of any kind required. In many instances, the radiation will be an electro-magnetic radiation, especially a thermic radiation, but an ultra-sonic radiation would also be conceivable. Furthermore, the sources may not only be an artificial source (such as the heating coils indicated), but may also be formed by sun-light. In a similar way, the kind of treatment may encompass a variety of treatments and reactions reaching from a simple heat treatment to decompose the solids supplied by screw 201 to gases, thus contributing to the above-mentioned over-pressure. Therefore, the above described arrangement of the nozzle member 203 would be particularly useful in a device as disclosed in patent application Ser. No. 07/866,323 now abandoned to A. Imhof et al., filed Apr. 9, 1992, the whole disclosure of which being incorporated by way of reference.

From the foregoing explanation it will be understood that with only two, particularly opposed, windows 124 it is sufficient to widen the stream only to two sides, i.e. on either side of a plane perpendicular to the plane of the drawing. Alternatively, more than two windows could be used (or even only one) in which case widening of the solid stream 202 is suitably effected only in the direction towards the respective windows.

FIG. 3, where the fluidized bed 2 and its perforated bottom plate 11 are only schematically illustrated and may be structured as described in connection with any of the foregoing FIGS., comprises a conical wall 314 to separate the incoming fluidizing gas from line 19 from outflowing gas/solid stream 302. The embodiment shows a downwardly directed nozzle member 303 having, similarly to the member 103 of FIG. 11a, two channels 304 and 304a. The difference to nozzle member 103 of FIG. 11a resides in that the nozzle member 303 points in the direction 7a of the outflowing gas/solid stream 302 and projects through the outlet orifice 3 of the fluidized bed 2 so that the stream 302 will surround the nozzle member 303 as a hollow stream.

Also in this embodiment, orifices 305 (which are arranged closer to the fluidized-bed apparatus 301 and its outlet orifice 3 than orifices 305a) supply a fluid serving to widen the stream 302. Orifices 305a may either serve to widen the stream 302 further or, as is preferred, to introduce a treatment fluid as in the embodiment of FIG. 11a. As in FIG. 11a, further nozzles (see FIG. 9) may be arranged outside the stream 302, for example below the conical wall 314.

The supply of fluids to the nozzle member 303 may either be effected via a horizontal supply line 304 supporting the nozzle member 303, or the nozzle member projects centrally from above the fluidized bed 2, e.g. being supported above the upper level of bed 2, as is indicated in broken lines, in order to minimize any erosion which may be caused by solids passing any horizontal support such as 304 by impinging against it. Nevertheless, if the risk of an erosion is relatively small, then more than one support and line 304, for example three equidistantly arranged lines or supports around the nozzle member 303 may be provided. In any case, formation of the above-mentioned "umbrella" will hardly be affected by such supports 304.

Figure 13:
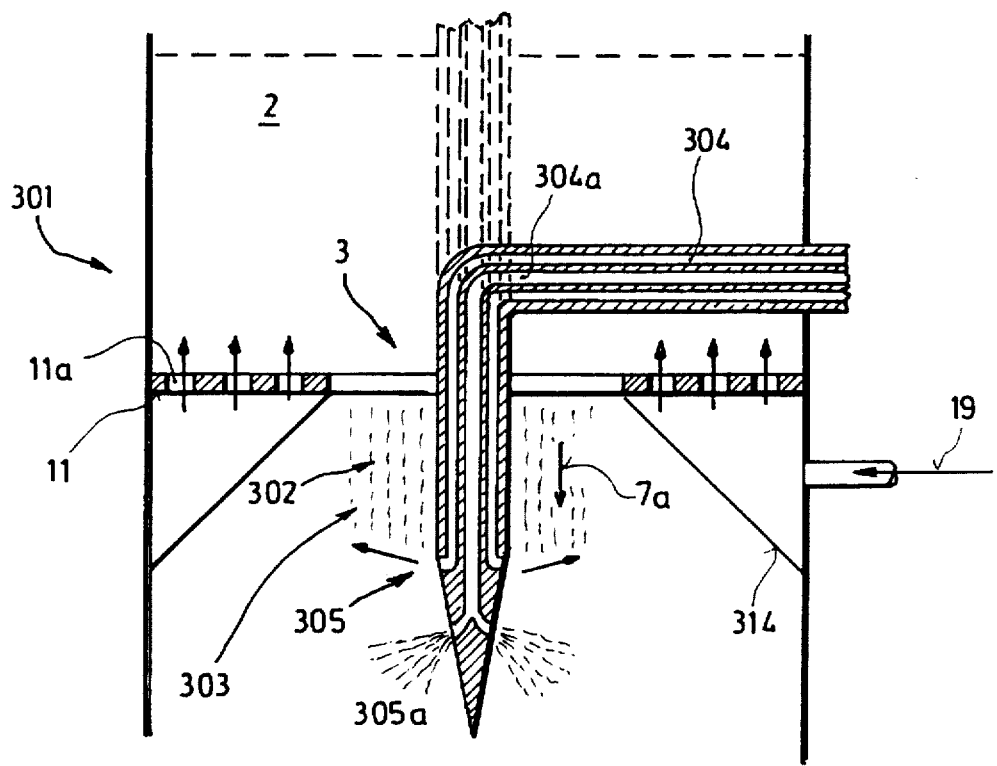
FIGS. 13–19 show further modifications of such an arrangement.
Figure 14:
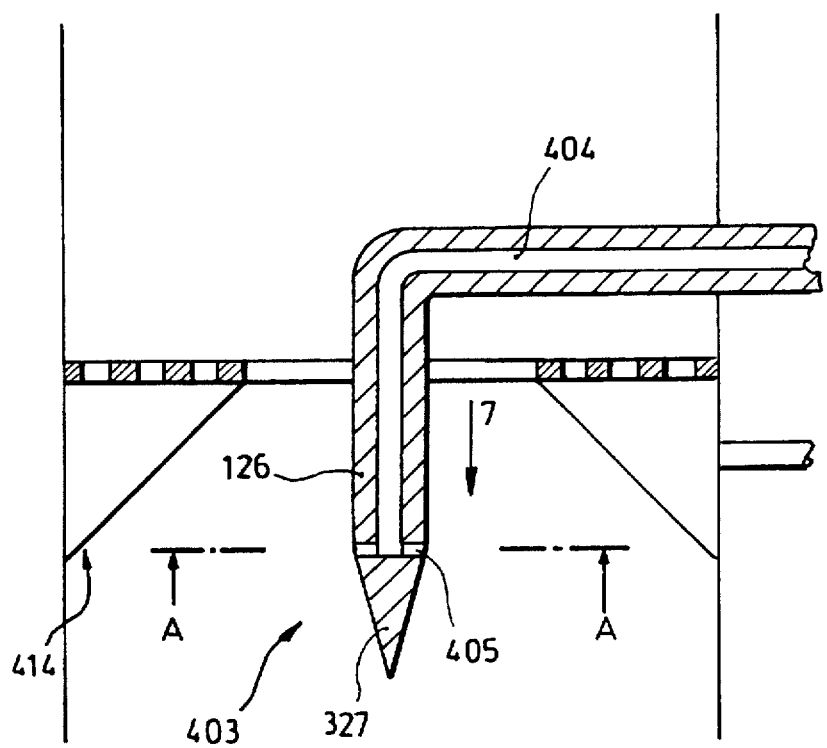
Figures 14A, 14B, 14C:
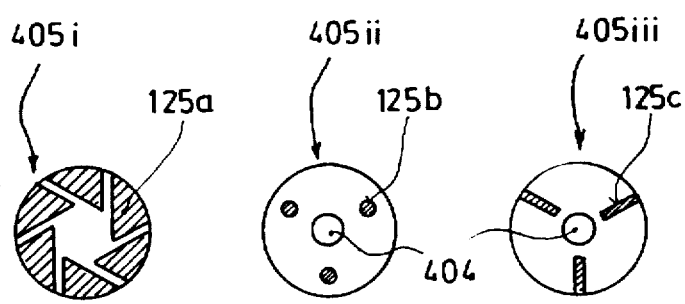

A similar construction as in FIG. 13 is shown in FIG. 14 where a nozzle member 403 with a single central channel 404 is shown. Possible cross-sectional configurations along the line A—A are shown in FIGS. 14a to 14c illustrating mainly the orifices 405. Thus, with orifices 405i, as in FIG. 14a, which extend slight tangentially to the center of the nozzle member, it would be possible to give the resulting "umbrella" a slight rotational movement around the nozzle member 405, thus equalizing the admixture of liquid. It is clear, however, that the rate and amount of the fluid exiting the orifices 405 or 405i should be set or controlled in such a manner that any "perforation" of the "umbrella" by fluid jets from the orifices are avoided.

In the case of the nozzles according to FIGS. 14a to 14c, there are spacers 125a to 125c of different cross-section between the upper (or support) portion 126 (see FIG. 14) and the nozzle tip 327. In this way, slot-like nozzle orifices will be formed. Such an arrangement will contribute to uniform distribution of outflowing fluid or liquid and may facilitate prevention of perforating the "umbrella" by fluid jets. Of course, the numer of spacers 125 used may be varied in any desired manner.

Figure 14D:
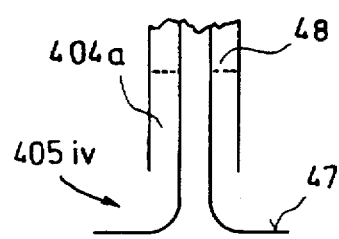

Another suitable arrangement is diagrammatically shown in FIG. 14d where the nozzle opens in longitudinal direction but has a deflector plate 47 forming an outwards protruding flange. Thus, fluid carried in several channels 404a, which are parallel to the logitudinal axis of the nozzle member, or in an annular channel 404a, will impinge the deflector plate 47 and will be deflected by 90° in radially outside direction. To this end, it is advantageous to have the transition to the plate 47 rounded. The central support for the deflector plate 47 can be held by screen-like or spoke-like spacers 48. This type of nozzle will provide an especially uniform distribution of treatment fluid towards surrounding the "umbrella" discussed above.

Figure 15:
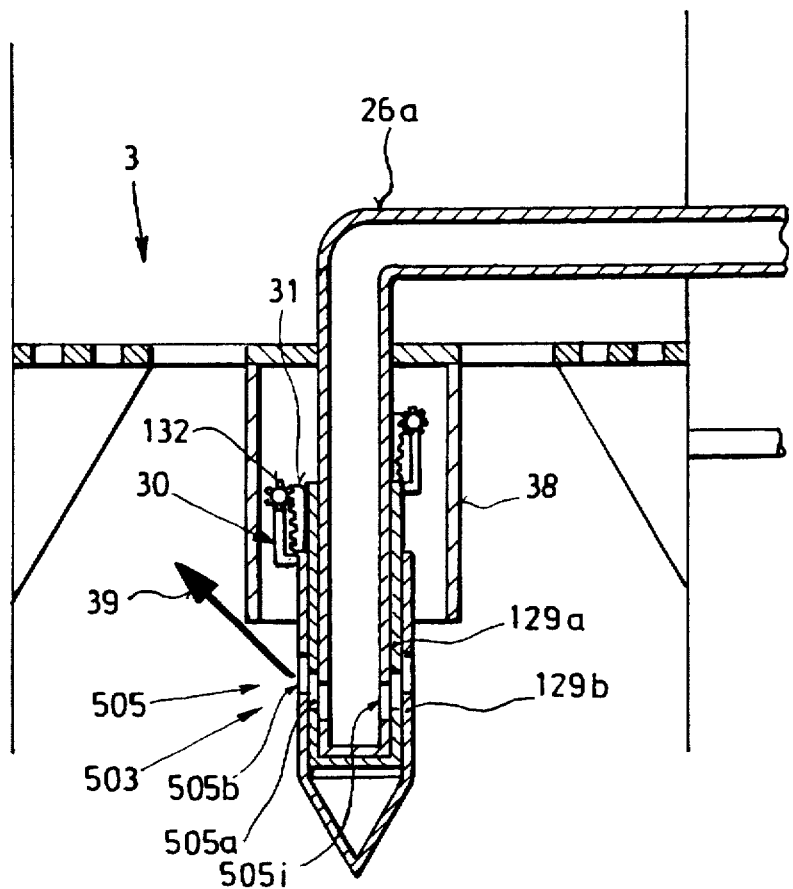
Figure 16:
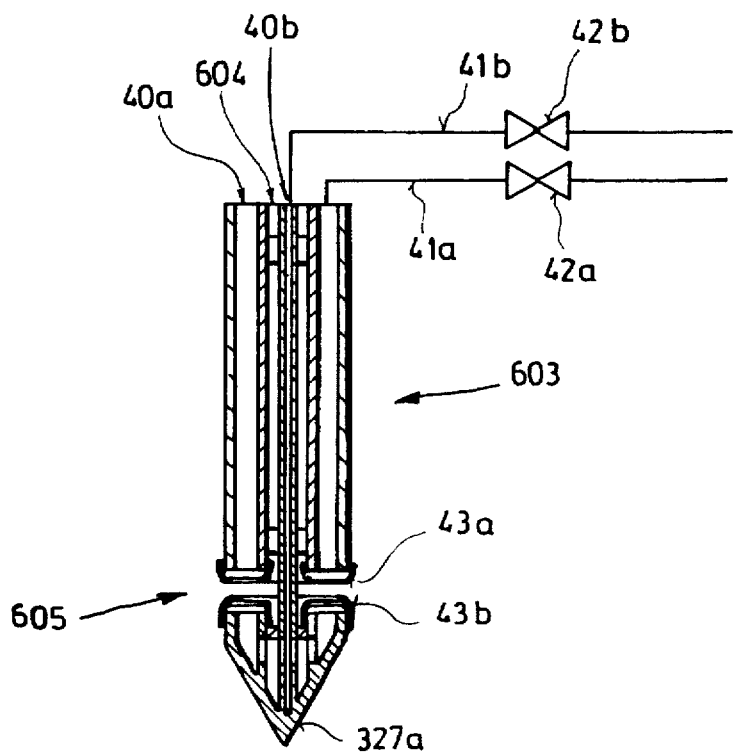

FIGS. 15 and 16 show nozzles 503 and 603 where the orifices 505 and 605 are adjustable either with respect to cross-section and/or to direction.

The embodiment of FIG. 15 comprises a nozzle holder 26a having outlet openings 505i at its free lower end. There are two tubular diaphragm elements 29a, 29b arranged concentrically and displaceably on the outside of holder 26a. These diaphragm elements 29a, 29b have also outlet openings 505a and 505b substantially corresponding to openings 505i of holder 26a. Openings 505a, 505b and 505i may be aligned to each other in one position of the diaphragm elements 29a, 29b. These elements 29a, 29b may, however, be displaced so as to vary the direction and/or cross-section of the resulting outlet channels formed successively by openings 505i, 505a and 505b. To this end, at least one adjustment device 30 is provided for displacing at least one diaphragm element 29a or 29b relatively to the holder 26a. In this way, an upward directed stream of fluid (according to arraow 39) out of nozzle member 503 may achieved if desired so as to better meet the requirements of the respective gas/solid stream flowing through outlet orifice 3.

In the embodiment shown, the adjustment device 30 is comprised of a gear 132 and an engaging toothed rack 131 by way of example, but it could assume any form desired so as to displace the diaphragm elements 29a, 29b with respect to the holder 26a. It can be seen that movement of inner diaphragm element 129a will be about half the movement of the outer diaphragm element 129b so that an appropriate movement transmission or control will be necessary. It is evident that, while two diaphragm elements have been shown, the invention is not restricted to the number of elements used. Moreover, in order to achieve a tangential outlet orifice of varying direction (in the manner of tangential orifices 405 of FIG. 14a), the diaphragm elements 129a, 129b could also be provided with an adjustment device for turning them around the longitudinal axis of holder 26a either alternatively to the adjustment device 30 or in addition to it. It is also evident from FIG. 15 that diaphragms 129a, 129b could be displaced in such a manner to reduce or increase the effective cross-section of openings 505i, 505a and 505b or even to shut it down.

In FIG. 16, there is another construction for varying the effective cross-section of an outlet orifice 605 of a nozzle member 603 with a simplified arrangement using less parts. Nozzle member 603 comprises three channels 604, 40a and 40b which contain a fluid. An annular channel 604 conveys that fluid which flows out of orifice 605 for widening the gas/solid stream (not shown here). Around annular channel 604, there is a further annular channel 40a the end surface or front surface of which being closed by an elastic annular diaphragm 43a. Alternatively or in addition, there may be a central channel 40b leading to the nozzle tip portion 327a which is hollow. The hollow interior of the tip portion 327a is covered by another annular elastic diaphragm 43b so that the orifice 605 is defined by two resilient diaphragm members 43a and 43b. If a control fluid is supplied via lines 41a and/or 41b (under control of valves or pumps 42a, 42b) either to channel 40a and/or 40b in order to increase the pressure within that channel, or if such control fluid is allowed to flow out of these channels, diaphragms 43a and 43b will correspondingly extend or restrict so as to decrease or increase the cross-sectional area of orifice 605.

Figure 17:
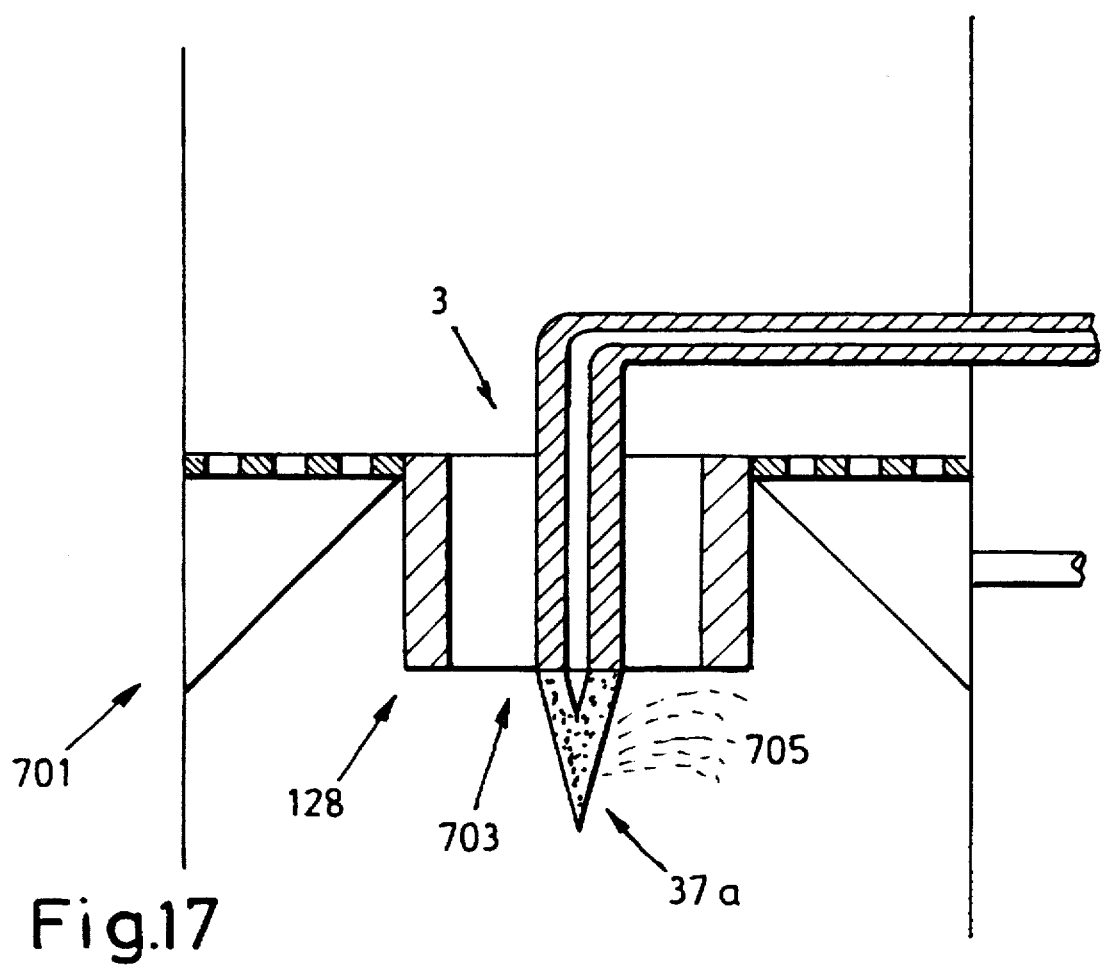

FIG. 17 is a similar illustration as FIG. 15, but showing another embodiment comprising a metering apparatus 701 including fluidized-bed apparatus 1 where the nozzle assembly 128 is not depicted in detail, but could be in the form of one of the embodiments discussed earlier. As in FIG. 15, the nozzle 703 extends centrally in the direction of the gas/solid stream exiting through outlet: orifice 3. In this embodiment, the nozzle 703 comprises a porous tip region 37a, where there are a great number of evenly distributed orifices or pores 705. In this way, the fluid conveyed by nozzel 37a is very finely distributed against the exiting gas/solid stream to be widened, although the direction of such flow of fluid cannot be controlled as well as it is the case with nozzle orifices shown in FIGS. 11a and 12 to 16.

Generally, the nozzle 103 to 603 or 37a should be made relatively short in order to minimize space requirements. Thus, the "umbrella" will form relatively in proximity of the metering apparatus. However, if the nozzle is used not only to widen the gas/sold stream, but also to apply some treatment fluid, a sufficient distance to the metering apparatus (such as 701) should be maintained in order to avoid adherence of such treatment fluid on it which may result in worsened function due to fouling.

Figure 17A:
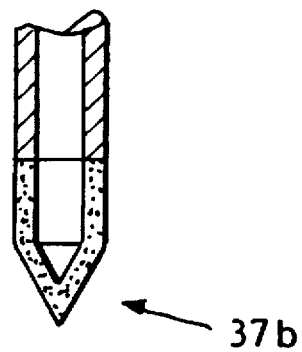
Figure 17B:
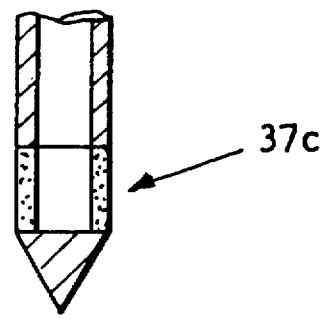

FIGS. 17a and 17b depict possible variations of the nozzle of FIG. 17, the nozzle having a porous end region 37b and 37c, respectively, mainly to influence the direction of discharge of the fluid from such nozzles.

Figure 18:
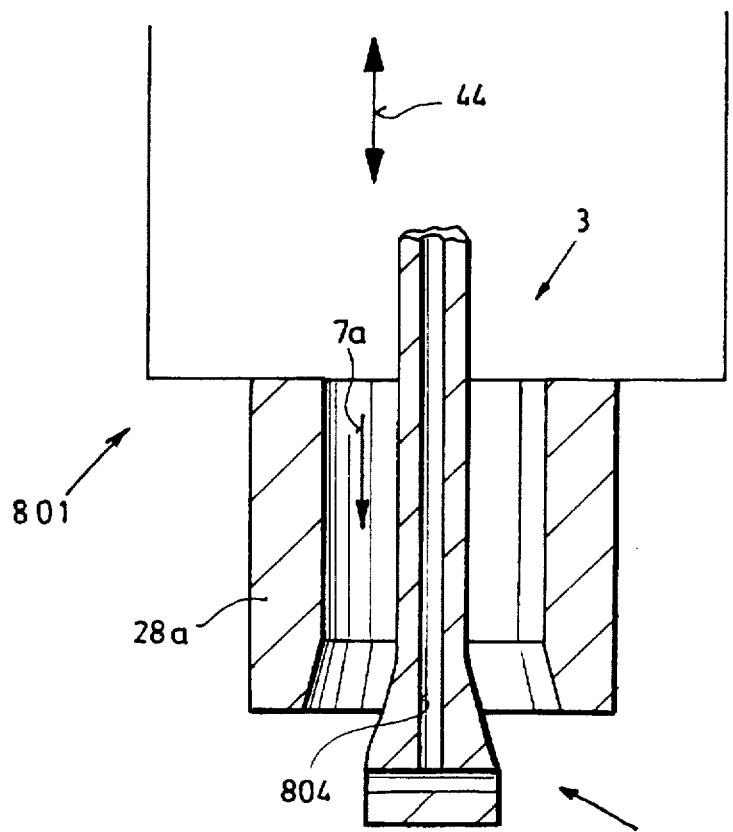

FIG. 18 indicates only roughly a metering apparatus together with a nozzle assembly 28a according to one of the previous embodiments. However, it should be noted that it would also be possible to form part 28a merely as a tubular discharge member. In any case, there is a nozzle 803 extending through the outlet orifice 3 and member or assembly 28, the free end of the nozzle 803 diverging outwardly to form a cone. Nozzle 803 is dicplaceably supported by means not shown to be adjusted in the directions of arrow 44. The supporting and adjusting device may be of any kind knwon in the art. It is only essential that the outer surface of the conical end of nozzle 803 is adapted to cooperate with the lower, suitably also conical, portion of the member or assembly 28a so as to render the throughput variable or can be shut down, if desired. Thus, the nozzle 803 may also serve as a control valve.

The conical shape of nozzle 803 will mechanically cause widening of the gas/solid stream exiting the orifice 3. In some cases, this may be sufficient, if the solids discharged are not too abrasive, so that the channel 804 and its orifices could also be omitted to save costs.

Figure 19:
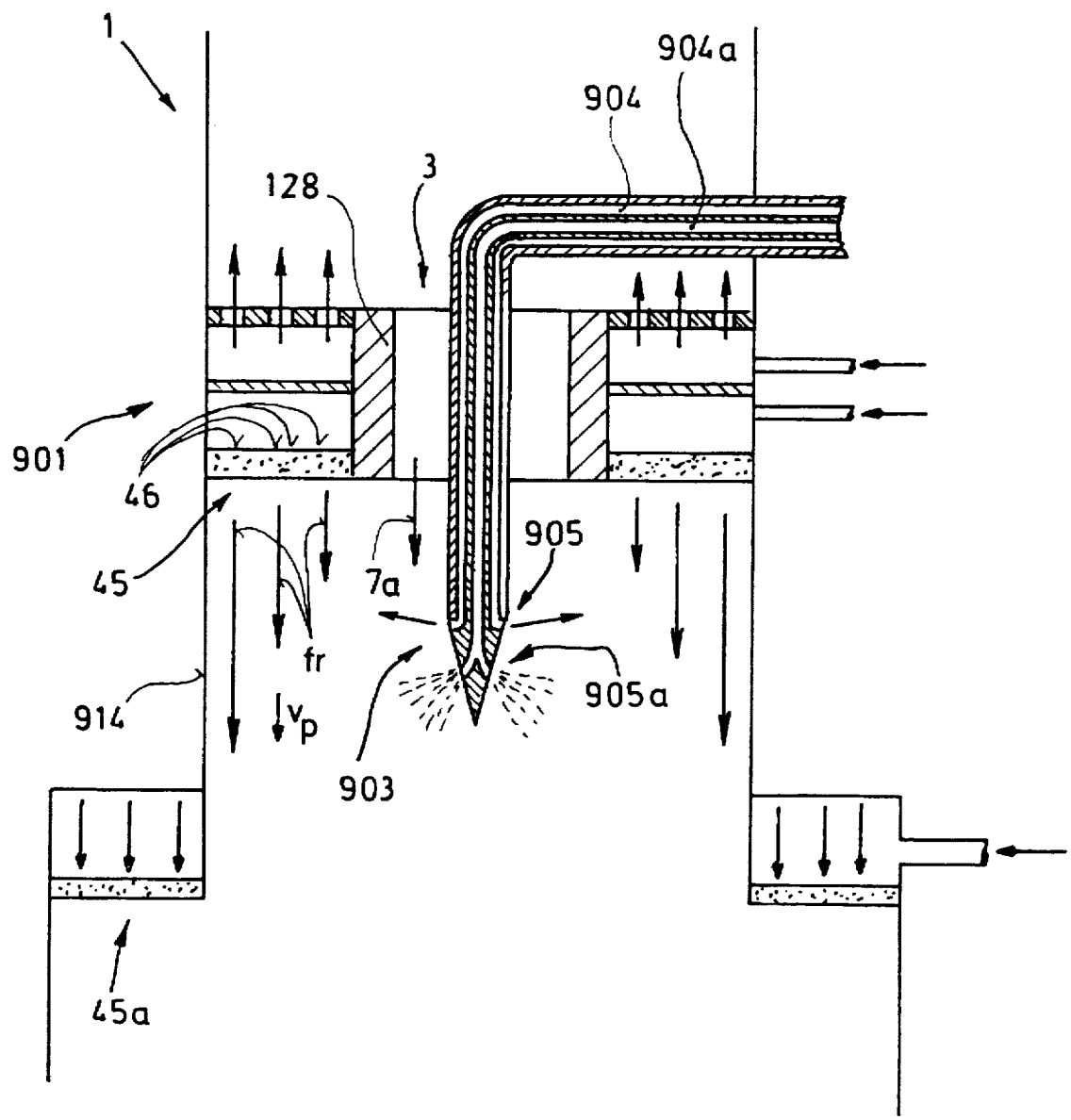

In some cases, however, it could be desirable to control the shape and size of the above-discussed "umbrella" by additional means. Such an embodiment is shown in FIG. 19. In principle, the nozzle 903 is similar to that of FIG. 13, thus including two fluid channels 904 and 904a, but it will be recognized that any other form of a nozzle will also be appropriate. In the present case, fluid for widening and enlarging the gas/solid stream from outlet orifice 3 is supplied via orifices 905, while orifice(s) 905a of channel 904a serves to convey either the same fluid or a different one which, in turn, may be used to enlarge the "umbrella" further and/or to treat the discharged solids. As in the foregoing embodiment, unit 128 may comprise either a nozzle assembly for exactly dosing the outflowing gas/solid stream or a mere tubular member.

In addition to the nozzle 903 for forming an umbrella-shape of the solids, there is a fluid supply arrangement 45 surrounding the unit 128. This supply arrangement 45n may be formed by a porous plate, but, in any case, suitably comprises a series of downwardly directed orifices 46 to blow a stream of fluid of an average rate $v_p$. The series of orifices extends radially outwardly from the center where the nozzle 903 is situated. It would, however also be possible to provide some nozzles at the outer periphery so as to have a stream of fluid along the vertical walls of housing 914 in order to prevent adhering of solids on them.

Preferably, the porosity (or the cross-section of discrete nozzle holes) is chosen such that there is a a profile of flow rates through the plate 45 symbolized by arrows fr of different length. This has a double effect in that, on the one hand, it may be dimensioned and used to clean the vertical walls of housing 914, as mentioned before, on the other hand it helps in forming the "umbrella", as may easily be seen from FIG. 19. Optionally, there may be substantially vertically and essentially radially extending guide elements (not shown). e.g. of sheet metal protruding from walls of housing 914 to the interior in order to further guide and influence the flow of fluid.

In addition, there may be another fluid supply arrangement 45a within the lower, broadened portion of housing 914. Also this measure has a double effect in that a more uniform distribution of solids is possible over a large spatial volume so that the solids are present as a diluted cloud. Moreover, the enlarged lower portion of the housing 914 acts as a diffusor contributing to such spatial distribution of the solids. It is evident that adjustable devices, corresponding to valves or pumps 13, 13', may be provided in each of the fluid supply lines (although not shown in FIG. 19) in order to adjust the respective flow rates. Moreover, the plate 45 may be removably secured to the housing in a manner known per se in order to enable varying of the profiles of rates fr. Also the plate 45a may be designed to provide a flow rate profile, as is done by plate 45, although for most applications a uniform distribution of flow will also be acceptable, mainly because the shape of the "umbrella" will be determined by the nozzle 903 and/or the fluid supply arrangement 45.

What is claimed is:

1. A dosing apparatus for dosing a particulate phase within a free-flowing two phase flow consisting of a gas phase and said particulate phase, said two phase flow leaving a fluidized bed of a certain level within a fluidized bed apparatus comprising:

a fluidizing gas inlet means at its bottom region to supply fluidizing gas through at least one fluidizing orifice, at least one outlet orifice to discharge said two phase flow out of said fluidized bed apparatus, the dosing apparatus further comprising:

at least one discharge pipe connected to said at least one outlet orifice, control means adjacent said outlet orifice for controlling a constant mass flow of said particulate phase through said discharge pipe and for controlling the homogeneity of said two phase flow, said control means including nozzle means for injecting gas into said two phase flow, gas supply means for feeding said nozzle means with control gas, and a pair of level sensor means provided at different heights of said fluidized bed apparatus to sense two upper threshold levels of said fluidized bed and to give an output signal when its respective level is reached to control said mass flow.

2. Apparatus as claimed in claim 1, wherein said pair of level sensor means comprise at least one pressure sensor arranged in the respective height of the level to be sensed to provide a pressure signal.

3. Apparatus as claimed in claim 1, further comprising processing means receiving said output signal and being connected to throughput adjusting means for adjusting at least one of throughputs selected from the group of fluidizing gas, control gas and supply rate of solids.

4. A dosing apparatus for dosing a particulate phase within a free-flowing two phase flow consisting of a gas phase and said particulate phase into a treatment space, said two phase flow leaving a fluidized bed of a certain level within a fluidized bed apparatus comprising:

fluidizing gas inlet means in its bottom region to supply a fluidizing gas through at least one outlet orifice of said fluidized bed apparatus, the dosing apparatus further comprising:

at least one discharge pipe connected to said at least one outlet orifice, control means adjacent said outlet orifice for controlling a constant mass flow of said particulate phase through said discharge pipe and for controlling the homogeneity of said two phase flow, said control means including nozzle means for injecting gas into said two phase flow, gas supply means for feeding said nozzle means with gas, and sensor means within said treatment space for determining at least one condition within said space and to give a corresponding output signal to control said mass flow.

5. Apparatus as claimed in claim 4, further comprising processing means receiving said output signal and being connected to throughput adjusting means for adjusting at least one of throughputs selected from the group of fluidizing gas, control gas and supply rate of solids.

6. Apparatus as claimed in claim 4, wherein said sensor means comprise at least one pressure sensor arranged in communication with said treatment space.

7. A dosing apparatus for dosing a particulate phase into a treatment zone, comprising:

supply means for said particulate phase as a particle stream into said treatment zone, at least one discharge opening leading out of said treatment zone, at least one source of a treatment medium to be supplied to said treatment zone, and widening means subsequent to said discharge opening for widening said stream of particulate phase for exposing a high surface area of the particles to said treatment medium.

8. Apparatus as claimed in claim 7, wherein said widening means comprise:

widening fluid supply means, nozzle means connected to said widening fluid supply means for directing a stream of fluid in a direction across the direction of said particle stream to deviate and widen it.

9. Apparatus as claimed in claim 7, further comprising supply means for a treatment medium into said treatment zone for treating the particles of said particulate phase, said supply means being independent from said widening means.

10. A dosing apparatus for dosing a particulate phase within a free-flowing two phase flow consisting of a gas phase and said particulate phase into a treatment zone, said two phase flow leaving a fluidized bed of a certain level within a fluidized bed apparatus comprising:

fluidizing gas inlet means in its bottom region to supply a fluidizing gas through at least one outlet orifice of said fluidized bed apparatus, at least one discharge pipe connected to said at least one outlet orifice to guide a stream of said particulate phase out of said fluidized bed, at least one source of a treatment medium to be supplied to said treatment zone, and widening means subsequent said discharge pipe for widening said stream of particulate phase and for exposing a high surface area of the particles to said treatment medium.

11. Apparatus as claimed in claim 10, further comprising control means for controlling a constant mass flow of said particulate phase through said discharge pipe and for controlling the homogeneity of said two phase flow.

12. Apparatus as claimed in claim 11, wherein a nozzle means in said discharge pipe for injecting gas into said two phase flow, gas supply means for feeding said nozzle means with gas.

13. Apparatus as claimed in claim 10, wherein said widening means comprise widening fluid supply means, nozzle means connected to said widening fluid supply means for directing a stream of fluid in a direction across the direction of said particle stream to deviate and widen it.

14. Apparatus as claimed in claim 13, wherein said nozzle means has a conical free end portion.

15. Apparatus as claimed in claim 14, wherein said nozzle means comprise at least one orifice in said conical end portion.

16. Apparatus as claimed in claim 14, wherein said nozzle means is axially movable, and said conical end portion is formed to restrict an outlet opening for said particle stream.

17. Apparatus as claimed in claim 13, wherein said nozzle means is centered with respect to said outlet discharge pipe.

18. Apparatus as claimed in claim 13, further comprising fluid supply means for supplying an additional fluid substantially parallely to said particle stream around said nozzle.

19. A method for dosing a particulate phase within a free-flowing two phase flow consisting of a gas phase and said particulate phase, said two phase flow leaving a fluidized bed of a certain level within a fluidized bed apparatus, the method comprising the steps of:

feeding a fluidizing gas through at least one fluidizing orifice at a bottom region of a fluidizing gas inlet;

discharging said two phase flow out of said fluidized bed apparatus via at least one outlet orifice thereof, there being at least one discharge pipe connected to said at least one outlet orifice;

controlling a constant mass flow of said particulate phase through said discharge pipe, and controlling the homogeneity of said two phase flow, both of said controlling steps being accomplished by injecting gas into said two phase flow via a nozzle;

sensing, at different heights of said fluidized bed apparatus, two upper threshold levels of said fluidized bed; and outputting a signal upon attainment of each of levels to control said mass flow.

20. A method for dosing a particulate phase within a free-flowing two phase flow, consisting of a gas phase and said particulate phase, into a treatment space, wherein said two phase flow leaves, a fluidized bed of a certain level within a fluidized bed apparatus comprising the steps of:

supplying a fluidizing gas through at least one outlet orifice of said fluidized bed apparatus at a bottom region of the bed, there being at least one discharge pipe connected to said at least one outlet orifice;

controlling a constant mass flow of said particulate phase through said discharge pipe, and controlling the homogeneity of said two phase flow, both of said controlling steps being accomplished by injecting gas into said two phase flow via a nozzle;

sensing the environment within said treatment space for determining at least one condition within said space; and outputting a signal corresponding to said condition to control said mass flow.

21. A method for dosing a particulate phase into a treatment zone, comprising steps of:

supplying said particulate phase as a particle stream into said treatment zone, there being at least one discharge opening leading out of said treatment zone;

providing a treatment medium to be supplied to said treatment zone; and widening said stream of particulate phase for exposing a high surface area of the particles to said treatment medium.

22. A method for dosing a particulate phase within a free-flowing two phase flow consisting of a gas phase and said particulate phase into a treatment zone, said two phase flow leaving a fluidized bed of a certain level within a fluidized bed apparatus having a fluidizing gas inlet in its bottom region, the method comprising steps of:

feeding a fluidizing gas through at least one orifice of said gas inlet, there being at least one discharge pipe connected to said at least one outlet orifice to guide a stream of said particulate phase out of said fluidized bed;

supplying at least one treatment medium to said treatment zone; and widening said stream of particulate phase for exposing a high surface area of the particles to said treatment medium.

* * * * *